(12) United States Patent
Dai et al.

(10) Patent No.: US 11,546,194 B1
(45) Date of Patent: Jan. 3, 2023

(54) RECONFIGURABLE INTELLIGENT SURFACE LINK IDENTIFICATION

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/305,006

(22) Filed: Jun. 29, 2021

(51) Int. Cl.
  *H04L 27/26* (2006.01)
  *H04L 27/22* (2006.01)
  *H04L 27/20* (2006.01)

(52) U.S. Cl.
  CPC ............ *H04L 27/261* (2013.01); *H04L 27/20* (2013.01); *H04L 27/22* (2013.01)

(58) Field of Classification Search
  CPC . H04B 7/14; H04B 7/145; H04B 7/15; H04B 7/10; H04L 25/20; H04L 27/261; H04L 27/18; H04L 27/20; H04L 27/22; H04L 27/02; H04L 27/04; H04L 27/06; H04L 27/0012; H04W 84/047
  See application file for complete search history.

(56) References Cited

U.S. PATENT DOCUMENTS

| | | | |
|---|---|---|---|
| 2021/0126359 A1* | 4/2021 | Kim | H01Q 3/46 |
| 2021/0302561 A1* | 9/2021 | Bayesteh | G01S 13/42 |
| 2022/0052764 A1* | 2/2022 | Medra | H04L 27/38 |

* cited by examiner

*Primary Examiner* — Betsy Deppe
(74) *Attorney, Agent, or Firm* — QUALCOMM Incorporated

(57) ABSTRACT

Various aspects of the present disclosure generally relate to wireless communication. In some aspects, a receiver may receive, from a transmitter, an indication of a modulation signature associated with a reconfigurable intelligent surface (RIS). The receiver may receive a signal that uses the modulation signature, wherein the modulation signature identifies a link associated with the RIS and the transmitter. Numerous other aspects are described.

30 Claims, 14 Drawing Sheets

RECONFIGURABLE INTELLIGENT SURFACE LINK IDENTIFICATION

FIELD OF THE DISCLOSURE

Aspects of the present disclosure generally relate to wireless communication and to techniques and apparatuses for reconfigurable intelligent surface (RIS) link identification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a receiver for wireless communication. The receiver may include a memory and one or more processors coupled to the memory. The one or more processors may be configured to receive, from a transmitter, an indication of a modulation signature associated with a reconfigurable intelligent surface (RIS). The one or more processors may be configured to receive a signal that uses the modulation signature, wherein the modulation signature identifies a link associated with the RIS and the transmitter.

Some aspects described herein relate to a transmitter for wireless communication. The transmitter may include a memory and one or more processors coupled to the memory. The one or more processors may be configured to transmit, to a receiver, an indication of a modulation signature associated with an RIS. The one or more processors may be configured to transmit a signal that is reflected by the RIS to the receiver, wherein the RIS redirects the signal using the modulation signature, and wherein the modulation signature identifies a link associated with the RIS and the transmitter.

Some aspects described herein relate to an RIS for wireless communication. The reconfigurable intelligent surface may include a memory and one or more processors coupled to the memory. The one or more processors may be configured to receive, from a transmitter, an indication of a modulation signature associated with the RIS. The one or more processors may be configured to receive, from the transmitter, a signal. The one or more processors may be configured to redirect the signal using the modulation signature, wherein the modulation signature identifies a link associated with the RIS and the transmitter.

Some aspects described herein relate to a method of wireless communication performed by a receiver. The method may include receiving, from a transmitter, an indication of a modulation signature associated with an RIS. The method may include receiving a signal that uses the modulation signature, wherein the modulation signature identifies a link associated with the RIS and the transmitter.

Some aspects described herein relate to a method of wireless communication performed by a transmitter. The method may include transmitting, to a receiver, an indication of a modulation signature associated with an RIS. The method may include transmitting a signal that is reflected by the RIS to the receiver, wherein the RIS redirects the signal using the modulation signature, and wherein the modulation signature identifies a link associated with the RIS and the transmitter.

Some aspects described herein relate to a method of wireless communication performed by an RIS. The method may include receiving, from a transmitter, an indication of a modulation signature associated with the RIS. The method may include receiving, from the transmitter, a signal. The method may include redirecting the signal using the modulation signature, wherein the modulation signature identifies a link associated with the RIS and the transmitter.

Some aspects described herein relate to a non-transitory computer-readable medium that stores a set of instructions for wireless communication by a receiver. The set of instructions, when executed by one or more processors of the receiver, may cause the receiver to receive, from a transmitter, an indication of a modulation signature associated with an RIS. The set of instructions, when executed by one or more processors of the receiver, may cause the receiver to receive a signal that uses the modulation signature, wherein the modulation signature identifies a link associated with the RIS and the transmitter.

Some aspects described herein relate to a non-transitory computer-readable medium that stores a set of instructions for wireless communication by a transmitter. The set of instructions, when executed by one or more processors of the transmitter, may cause the transmitter to transmit, to a receiver, an indication of a modulation signature associated with an RIS. The set of instructions, when executed by one or more processors of the transmitter, may cause the transmitter to transmit a signal that is reflected by the RIS to the receiver, wherein the RIS redirects the signal using the modulation signature, and wherein the modulation signature identifies a link associated with the RIS and the transmitter.

Some aspects described herein relate to a non-transitory computer-readable medium that stores a set of instructions for wireless communication by an RIS. The set of instructions, when executed by one or more processors of the RIS, may cause the RIS to receive, from a transmitter, an indication of a modulation signature associated with the RIS. The set of instructions, when executed by one or more processors of the RIS, may cause the RIS to receive, from the transmitter, a signal. The set of instructions, when executed by one or more processors of the RIS, may cause the RIS to redirect the signal using the modulation signature, wherein the modulation signature identifies a link associated with the RIS and the transmitter.

Some aspects described herein relate to an apparatus for wireless communication. The apparatus may include means for receiving, from a transmitter, an indication of a modulation signature associated with an RIS. The apparatus may include means for receiving a signal that uses the modulation signature, wherein the modulation signature identifies a link associated with the RIS and the transmitter.

Some aspects described herein relate to an apparatus for wireless communication. The apparatus may include means for transmitting, to a receiver, an indication of a modulation signature associated with an RIS. The apparatus may include means for transmitting a signal that is reflected by the RIS to the receiver, wherein the RIS redirects the signal using the modulation signature, and wherein the modulation signature identifies a link associated with the RIS and the transmitter.

Some aspects described herein relate to an apparatus for wireless communication. The apparatus may include means for receiving, from a transmitter, an indication of a modulation signature associated with the apparatus. The apparatus may include means for receiving, from the transmitter, a signal. The apparatus may include means for redirecting the signal using the modulation signature, wherein the modulation signature identifies a link associated with the apparatus and the transmitter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
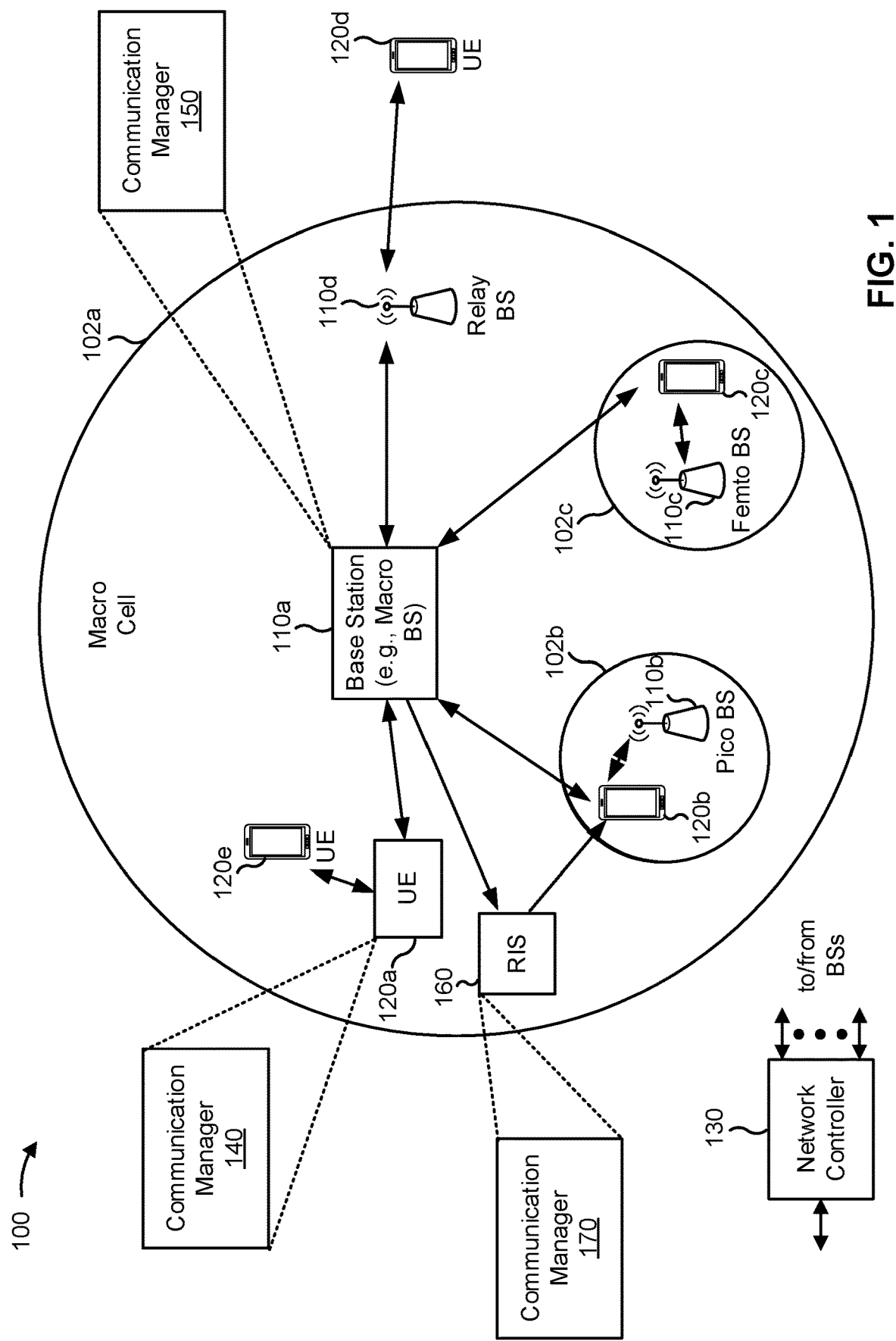
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a transmitter, an indication of a modulation signature associated with a reconfigurable intelligent surface (RIS); and receive a signal that uses the modulation signature, wherein the modulation signature identifies a link associated with the RIS and the transmitter. Additionally, or alternatively, the communication manager 140 may perform one or more other operations described herein.

In some aspects, the base station 110 may include a communication manager 150. As described in more detail elsewhere herein, the communication manager 150 may transmit, to a receiver, an indication of a modulation signature associated with an RIS; and transmit a signal that is reflected by the RIS to the receiver, wherein the RIS redirects the signal using the modulation signature, and wherein the modulation signature identifies a link associated with the RIS and the transmitter. Additionally, or alternatively, the communication manager 150 may perform one or more other operations described herein.

As shown in FIG. 1, the wireless network 100 may include an RIS 160. The RIS 160 may include a communication manager 170. The RIS 160 may include one or more reconfigurable elements capable of redirecting or reflecting signals transmitted by a base station 110 or a UE 120.

In some aspects, the RIS 160 may include the communication manager 170. As described in more detail elsewhere herein, the communication manager 170 may receive, from a transmitter, an indication of a modulation signature associated with the RIS; receive, from the transmitter, a signal; and may cause the signal to be redirected using the modulation signature, wherein the modulation signature identifies a link associated with the RIS and the transmitter. Additionally, or alternatively, the communication manager 170 may perform one or more other operations described herein.

As indicated above, FIG. 1 is provided as an example. Other examples may differ from what is described with regard to FIG. 1.

Figure 2:
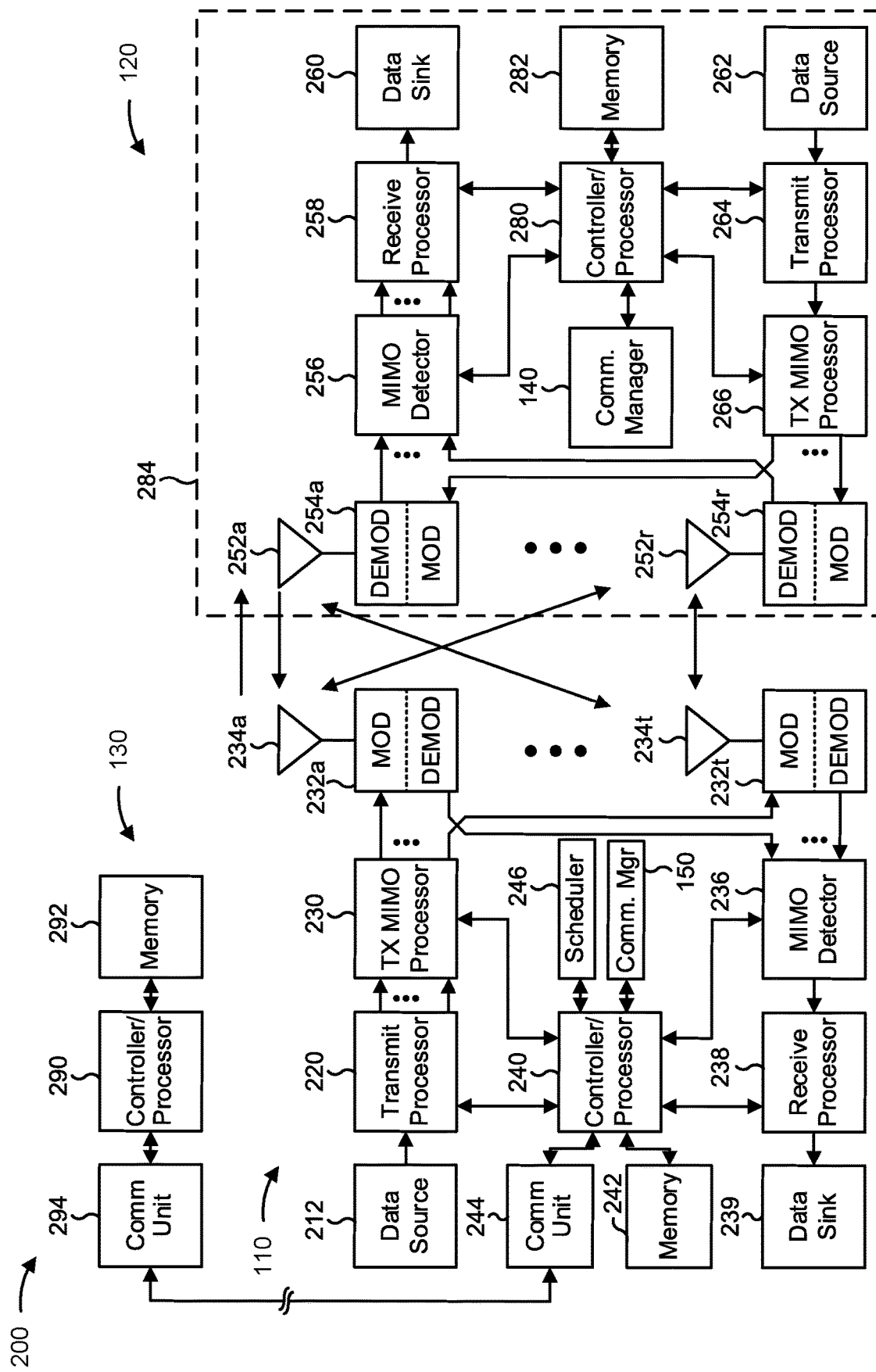
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A, 5B, 6, 7, 8, 9, and/or 10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A, 5B, 6, 7, 8, 9, and/or 10).

The controller/processor 240 of the base station 110, the controller/processor 280 of the UE 120, a controller/processor of a reconfigurable intelligent surface (RIS) (not shown in FIG. 2), and/or any other component(s) of FIG. 2 may perform one or more techniques associated with reconfigurable intelligent surface (RIS) link identification, as described in more detail elsewhere herein. In some aspects, the transmitter described herein is the base station 110 or the UE 120, is included in the base station 110 or the UE 120, or includes one or more components of the base station 110 or the UE 120 shown in FIG. 2. In some aspects, the receiver described herein is the UE 120, is included in the UE 120, or includes one or more components of the UE 120 shown in FIG. 2.

Figure 8:
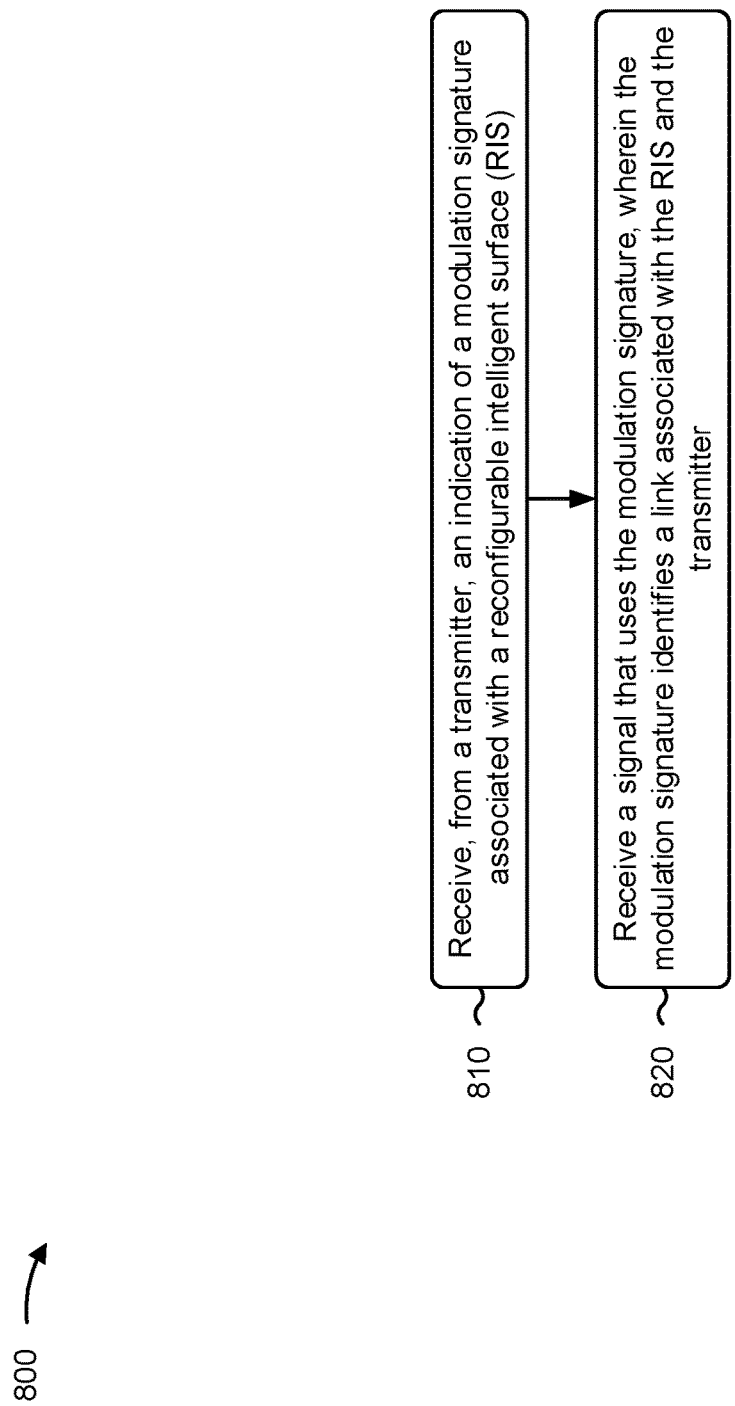
FIGS. 8-10 are diagrams illustrating example processes associated with RIS link identification, in accordance with the present disclosure.
Figure 9:
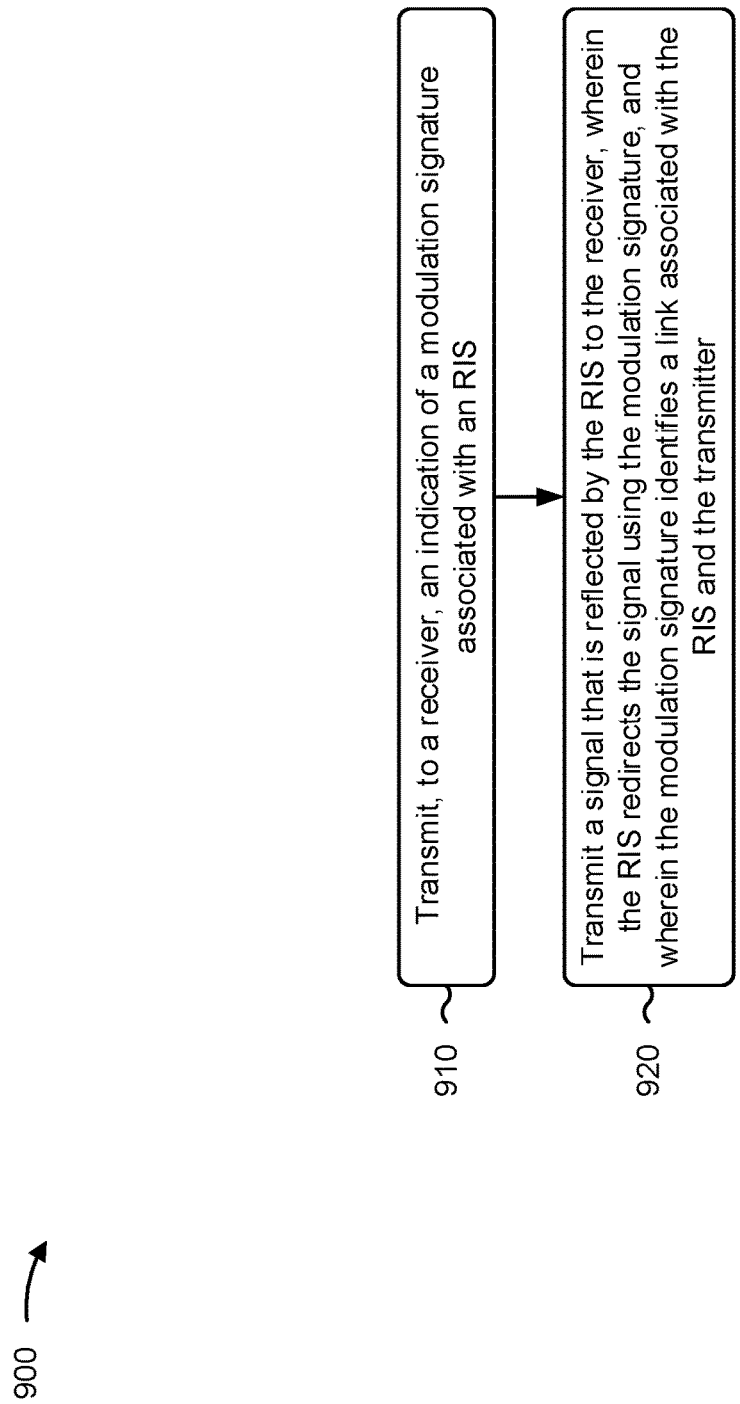
Figure 10:
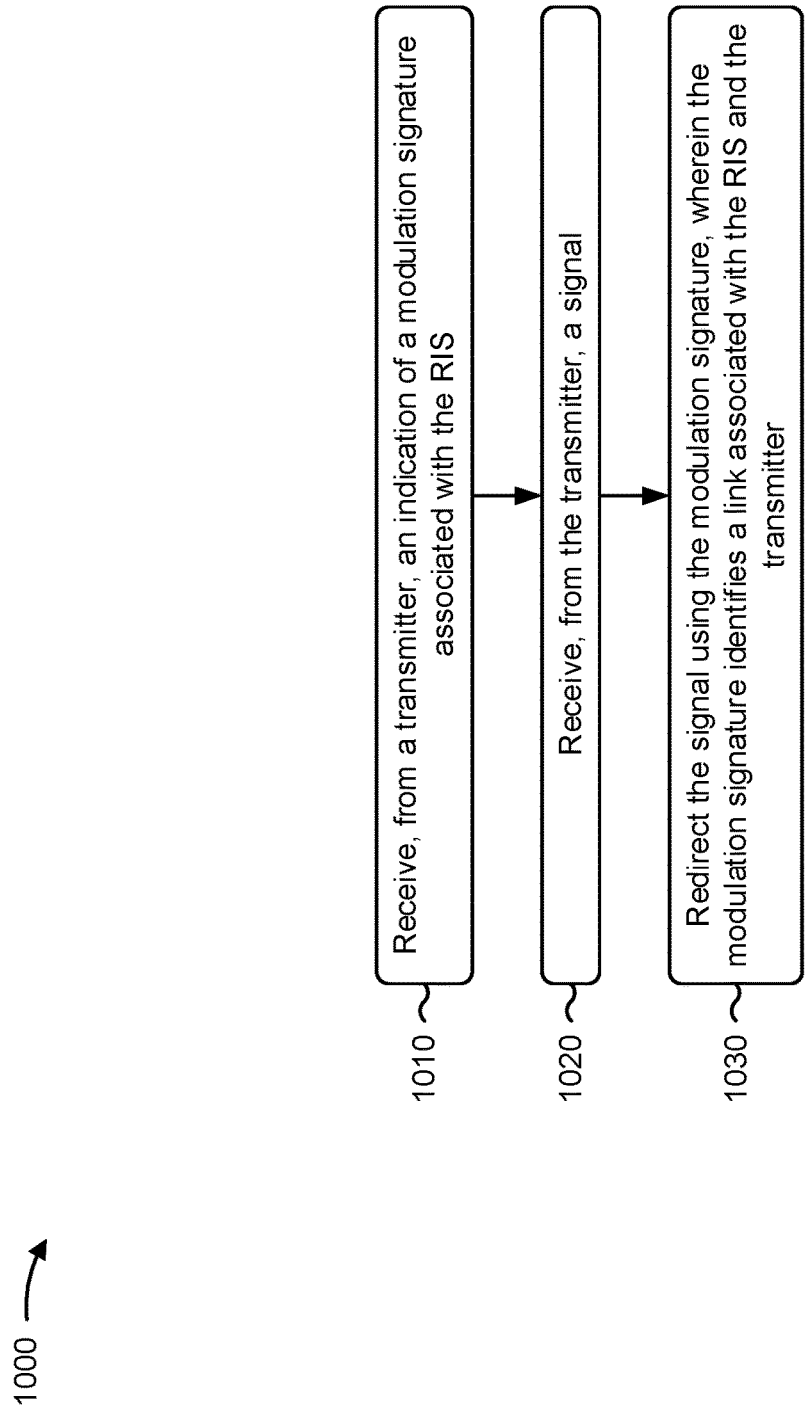

For example, the controller/processor 240 of the base station 110, the controller/processor 280 of the UE 120, the controller/processor of the RIS, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the receiver includes means for receiving, from a transmitter, an indication of a modulation signature associated with an RIS; and/or means for receiving a signal that uses the modulation signature, wherein the modulation signature identifies a link associated with the RIS and the transmitter. In some aspects, the means for the receiver to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some other aspects, the means for the receiver to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitter includes means for transmitting, to a receiver, an indication of a modulation signature associated with an RIS; and/or means for transmitting a signal that is reflected by the RIS to the receiver, wherein the RIS redirects the signal using the modulation signature, and wherein the modulation signature identifies a link associated with the RIS and the transmitter. In some aspects, the means for the transmitter to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some other aspects, the means for the transmitter to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an RIS includes means for receiving, from a transmitter, an indication of a modulation signature associated with the RIS; means for receiving, from the transmitter, a signal; and/or means for redirecting the signal using the modulation signature, wherein the modulation signature identifies a link associated with the RIS and the transmitter. In some aspects, the means for the RIS to perform operations described herein may include, for example, one or more of communication manager 170, a transmit processor, an antenna, a modem, a receive processor, a controller/processor, a memory, and/or one or more reconfigurable elements.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
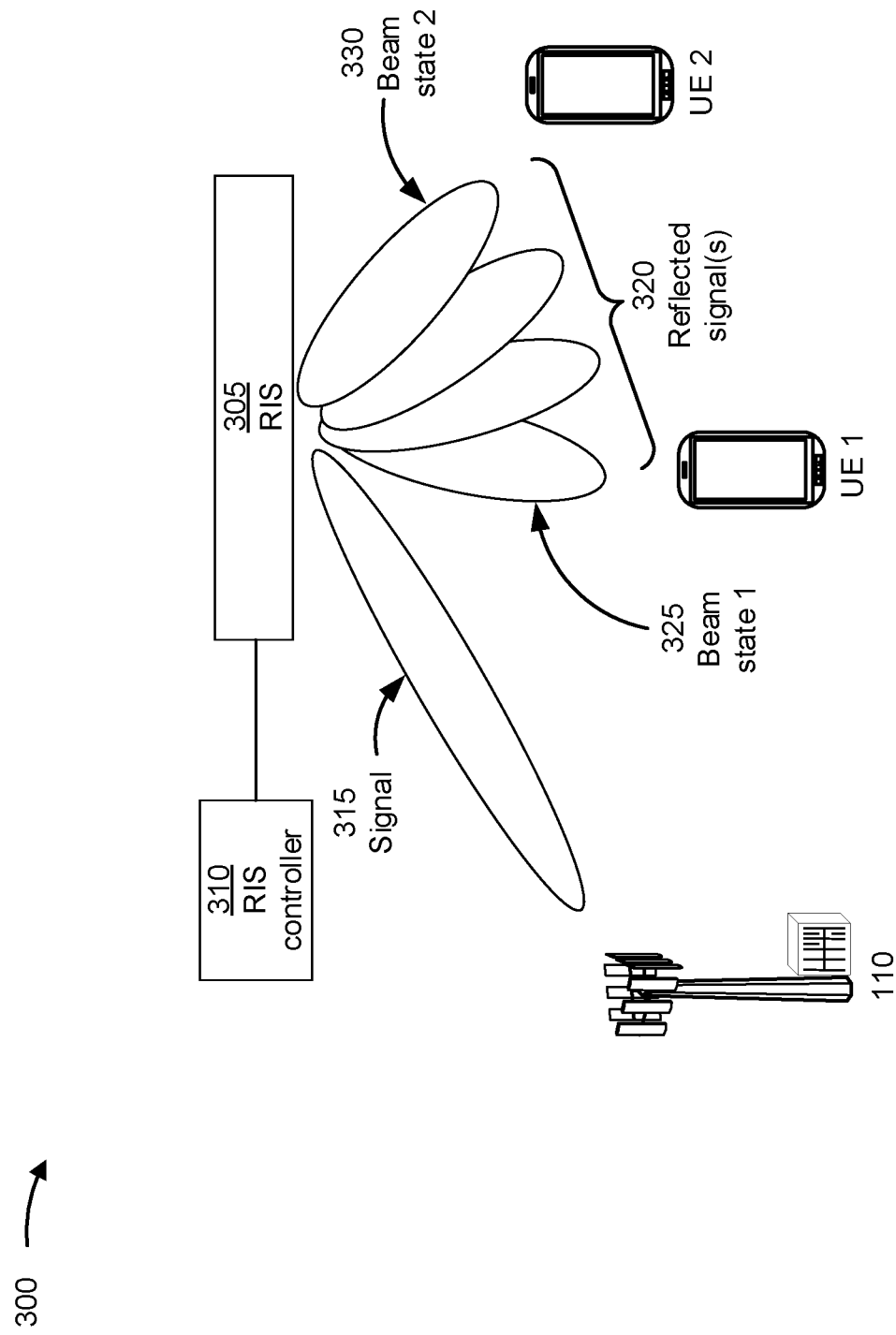
FIG. 3 is a diagram illustrating an example of communications using a reconfigurable intelligent surface (RIS), in accordance with the present disclosure.

FIG. 3 is a diagram illustrating an example 300 of communications using an RIS, in accordance with the present disclosure. As shown in FIG. 3, a base station 110 may communicate with a UE 120 in a wireless network, such as the wireless network 100. The base station 110 and the UE 120 may use an RIS 305 to communicate with one another. For example, the RIS 305 may reflect or redirect a signal to the base station 110 and/or the UE 120. The RIS 305 may also be referred to as an intelligent reflecting surface. In some examples, the RIS 305 may be a repeater.

The RIS 305 may be, or may include, a planar or two-dimensional structure or surface that is designed to have properties to enable a dynamic control of signals or electromagnetic waves reflected and/or redirected by the RIS 305. The RIS 305 may include one or more reconfigurable elements. For example, the RIS 305 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the RIS 305 may be capable of modifying one or more properties (e.g., direction, beam width, phase, amplitude, and/or polarization) of an impinging signal.

The reconfigurable elements of the RIS 305 may be controlled and/or configured by an RIS controller 310. The RIS controller 310 may be a control module (e.g., a controller and/or a processor) that is capable of configuring the electromagnetic characteristic(s) of each reconfigurable element of the RIS 305. The RIS controller 310 may be, or may be included in, the communication manager 170. Alternatively, the communication manager 170 may be included in the RIS controller 310. The RIS controller 310 may receive control communications (e.g., from a base station 110 and/or a UE 120) indicating one or more properties of reflected signals (e.g., indicating a desired direction, a desired beam width, a desired phase, a desired amplitude, and/or a desired polarization). Therefore, in some examples, the RIS 305 may be capable of receiving communications (e.g., via the RIS 305 and/or the RIS controller 310). In some examples, the RIS 305 and/or the RIS controller 310 may not have transmit capabilities (e.g., the RIS 305 may be capable of reflecting and/or redirecting impinging signals via the reconfigurable elements, but may not be capable of generating and/or transmitting signals). Alternatively, in some examples, the RIS 305 and/or the RIS controller 310 may have transmit capabilities (e.g., the RIS 305 may be capable of reflecting and/or redirecting impinging signals via the reconfigurable elements and may be capable of generating and/or transmitting signals). For example, the RIS 305 and/or the RIS controller 310 may include one or more antennas and/or antenna elements for receiving and/or transmitting signals.

For example, as shown in FIG. 3, the base station 110 may transmit a signal 315. The signal 315 may be transmitted in a spatial direction toward the RIS 305. The RIS 305 may configure the reconfigurable elements of the RIS 305 to reflect and/or redirect the signal 315 in a desired spatial direction and/or with one or more desired signal characteristics (e.g., beam width, phase, amplitude, frequency, and/or polarization). For example, as shown by reference number 320, the RIS 305 may be capable of reflecting the signal 315 in one or more spatial directions. Although multiple beams are shown in FIG. 3 representing different beam states or beam directions of the RIS 305, the RIS 305 may be capable of reflecting a signal with one beam state or one beam direction at a time. For example, in one case, as shown by reference number 325, the RIS 305 may be configured to reflect the signal 315 using a first beam state (e.g., beam state 1). "Beam state" may refer to a spatial direction and/or a beam of a reflected signal (e.g., a signal reflected by the RIS 305). The first beam state may cause the signal 315 to be reflected in a spatial direction toward a first UE 120 (e.g., UE 1). As shown by reference number 330, in another case, the RIS 305 may be configured to reflect the signal 315 using a second beam state (e.g., beam state 2). The second beam state may cause the signal 315 to be reflected in a spatial direction toward a second UE 120 (e.g., UE 2).

The RIS 305 may be deployed in a wireless network (such as the wireless network 100) to improve communication performance and efficiency. For example, the RIS 305 may enable a transmitter (e.g., a base station 110 or a UE 120) to control the scattering, reflection, and refraction characteristics of signals transmitted by the transmitter, to overcome the negative effects of wireless propagation. For example, the RIS 305 may effectively control signal characteristics (e.g., spatial direction, beam width, phase, amplitude, frequency, and/or polarization) of an impinging signal without a need for complex decoding, encoding, and radio frequency processing operations. Therefore, the RIS 305 may provide increased channel diversity for propagation of signals in a wireless network. The increased channel diversity provides robustness to channel fading and/or blocking, such as when higher frequencies are used by the base station 110 and/or the UE 120 (e.g., millimeter wave frequencies and/or sub-terahertz frequencies). Moreover, as the RIS 305 does not need to perform complex decoding, encoding, and radio frequency processing operations, the RIS 305 may provide a more cost and energy efficient manner of reflecting and/or redirecting signals in a wireless network (e.g., as compared to other mechanisms for reflecting and/or redirecting signals, such as a relay device).

As indicated above, FIG. 3 is provided as an example. Other examples may differ from what is described with respect to FIG. 3.

Figure 4:
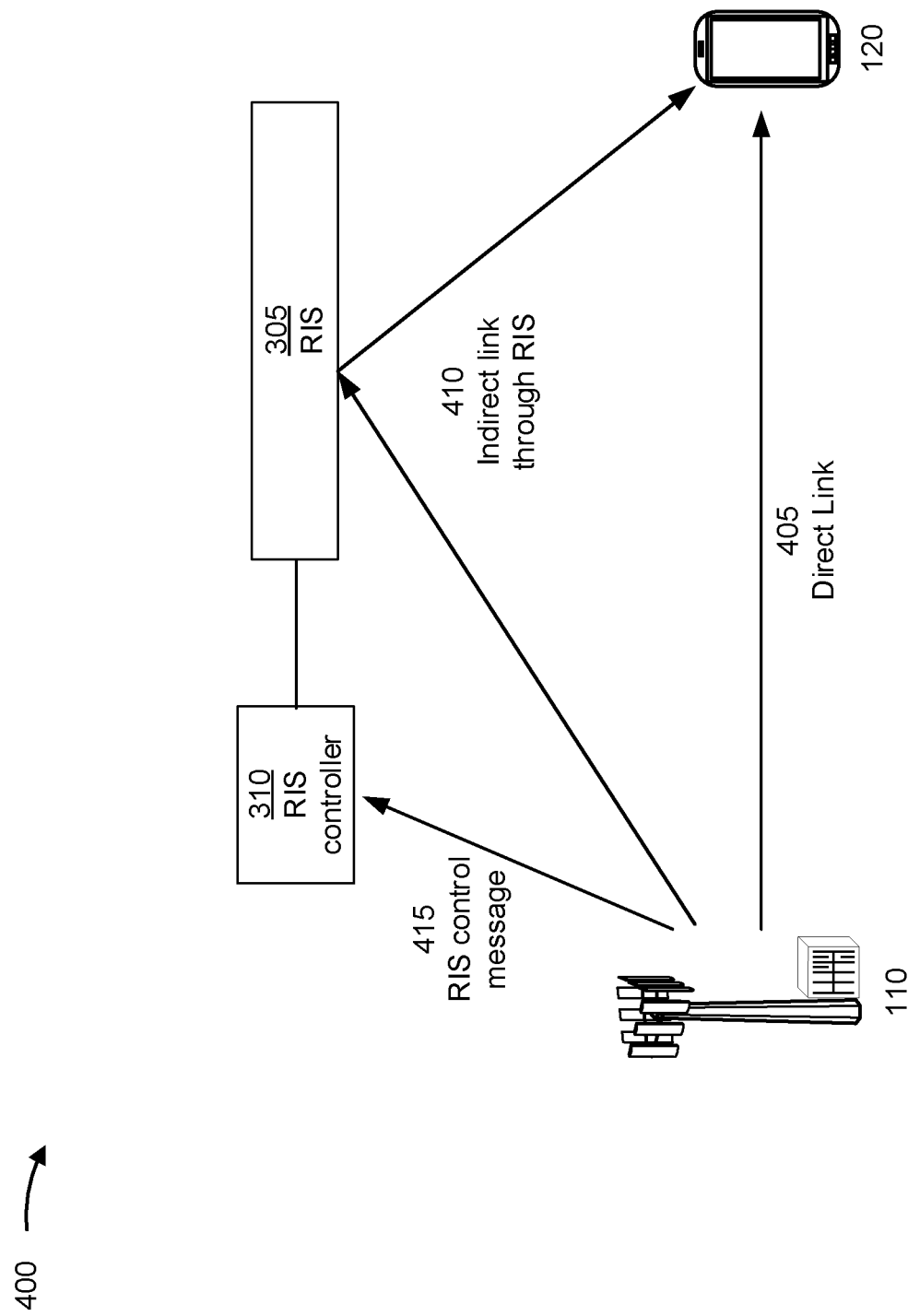
FIG. 4 is a diagram illustrating an example of communication links in a wireless network that includes an RIS, in accordance with the present disclosure.

FIG. 4 is a diagram illustrating an example 400 of communication links in a wireless network that includes an RIS, in accordance with the present disclosure. As shown, example 400 includes a base station 110, a UE 120, and the RIS 305. The RIS 305 may be controlled and/or configured by the RIS controller 310.

As shown in FIG. 4, the UE 120 may receive a communication (e.g., data and/or control information) directly from the base station 110 as a downlink communication. Additionally, or alternatively, the UE 120 may receive a communication (e.g., data and/or control information) indirectly from the base station 110 via the RIS 305. For example, the base station 110 may transmit the communication in a spatial direction toward the RIS 305, and the RIS 305 may redirect or reflect the communication to the UE 120.

In some examples, the UE 120 may communicate directly with the base station 110 via a direct link 405. For example, a communication may be transmitted via the direct link 405. A communication transmitted via the direct link 405 between the UE 120 and the base station 110 does not pass through and is not reflected or redirected by the RIS 305. In some examples, the UE 120 may communicate indirectly with the base station 110 via an indirect link 410. For example, a communication may be transmitted via different segments of the indirect link 410. A communication transmitted via the indirect link 410 between the UE 120 and the base station 110 is reflected and/or redirected by the RIS 305. As shown in FIG. 4 and by reference number 415, the base station 110 may communicate with the RIS 305 (e.g., with the RIS controller 310) via a control channel. For example, the base station 110 may indicate, in an RIS control message, spatial direction(s) and/or signal characteristics for signals reflected by the RIS 305. The RIS controller 310 may configure reconfigurable elements of the RIS 305 in accordance with the RIS control message. In some examples, the RIS control message may indicate information associated with the wireless network, such as a frame structure, time synchronization information, and/or slot boundaries, among other examples. Using the communication scheme shown in FIG. 4 may improve network performance and increase reliability by providing the UE 120 with link diversity for communicating with the base station 110.

In some cases, the UE 120 may receive a communication (e.g., the same communication) from the base station 110 via both the direct link 405 and the indirect link 410. In other cases, the base station 110 may select one of the links (e.g., either the direct link 405 or the indirect link 410), and may transmit a communication to the UE 120 using only the selected link. Alternatively, the base station 110 may receive an indication of one of the links (e.g., either the direct link 405 or the indirect link 410), and may transmit a communication to the UE 120 using only the indicated link. The indication may be transmitted by the UE 120 and/or the RIS 305. In some examples, such selection and/or indication may be based at least in part on channel conditions and/or link reliability.

However, channel characteristics of the direct link 405 and the indirect link 410 may be different. For example, the direct link 405 and the indirect link 410 may be distinguishable in the spatial domain and/or the time domain. Additionally, or alternatively, the direct link 405 and the indirect link 410 may be associated with different Doppler characteristics (e.g., Doppler spread and/or Doppler shift). Therefore, the direct link 405 and the indirect link 410 may need to be separately maintained. For example, separate beam management (e.g., separate beam acquisition and/or beam tracking) may need to be performed for the direct link 405 and the indirect link 410. As another example, transmit and/or receive processing of signals associated with the direct link 405 and the indirect link 410 may be different due to different path delays and/or Doppler characteristics, and/or due to separate time and/or frequency synchronizations of the direct link 405 and the indirect link 410. Moreover, transmit power allocation for the direct link 405 and the indirect link 410 may be different due to different fading conditions of the direct link 405 and the indirect link 410. As a result, the direct link 405 and the indirect link 410 may be maintained simultaneously, but may need to be treated separately (e.g., by the base station 110 and/or the UE 120). Additionally, a wireless network may include multiple RISs 305, each of which may need to be separately maintained by the base station 110 and/or the UE 120. Further, each RIS 305 may be associated with multiple beam states and/or beam directions (e.g., as described in connection with FIG. 3), each of which may need to be maintained and/or identified by the base station 110 and/or the UE 120. However, the base station 110 and/or the UE 120 may be unable to differentiate between signals transmitted via the direct link 405 and the indirect link 410. Therefore, the base station 110 and/or the UE 120 may treat signals transmitted via the direct link 405 and the indirect link 410 the same, resulting in reduced communication performance and/or efficiency.

Some techniques and apparatuses described herein enable RIS link identification. For example, some techniques and apparatuses described herein enable a UE 120 and/or a base station 110 to differentiate between the direct link 405 and the indirect link 410 (e.g., the RIS link). For example, in some aspects, an RIS may be associated with a modulation signature. The modulation signature may identify the RIS and/or a beam state associated with the RIS. The modulation signature may be associated with a modulation of signals reflected by the RIS in phase, polarization, and/or amplitude. For example, the RIS may modulate impinging signals in phase, polarization, and/or amplitude to indicate the modulation signature associated with the RIS. A receiver (e.g., a UE 120 and/or a base station 110) may receive a signal that uses the modulation signature, indicating that the signal is transmitted via an indirect link (e.g., the RIS link). In some aspects, a transmitter (e.g., a base station 110 and/or a UE 120) may transmit, to the receiver and/or the RIS, an indication of the modulation signature associated with the RIS.

As a result, the transmitter and/or the receiver are enabled to identify and distinguish the direct link from the indirect link. Therefore, the transmitter and/or the receiver may simultaneously maintain the direct link and the indirect link, while also treating the direct link and the indirect link separately and/or differently. This may improve communication performance and efficiency by enabling the indirect link (e.g., associated with the RIS) to be associated with different beam management, communication processing, and/or transmit power allocation, among other examples, than the direct link (e.g., that is directly between the transmitter and the receiver).

In some aspects, where a phase modulation signature is used by the RIS, symbols of a signal reflected by the RIS that do not include a reference signal (e.g., a demodulation reference signal (DMRS) or a phase tracking reference signal (PTRS)) may be modulated in phase to ensure that the phase modulation signature used by the RIS does not cause communication performance degradation for receivers that are not capable of identifying the phase modulation signature and/or for receivers that receive signals from multiple indirect links (e.g., resulting in a combination of phase changes at the receiver). For example, a symbol of a signal reflected by the RIS that does not include a reference signal may be modulated in phase by an amount that is interpolated and/or extrapolated from a phase of one or more symbols located adjacent to the symbol (e.g., that do include a reference signal). In this way, the reflected signal may compensate for phase noise (e.g., that would be interpreted by receivers that are not capable of identifying the phase modulation signature). This may improve communication performance for the receivers that are not capable of identifying the phase modulation signature by compensating for phase noise caused by the phase modulation signature.

As indicated above, FIG. 4 is provided as an example. Other examples may differ from what is described with respect to FIG. 4.

Figure 5A:
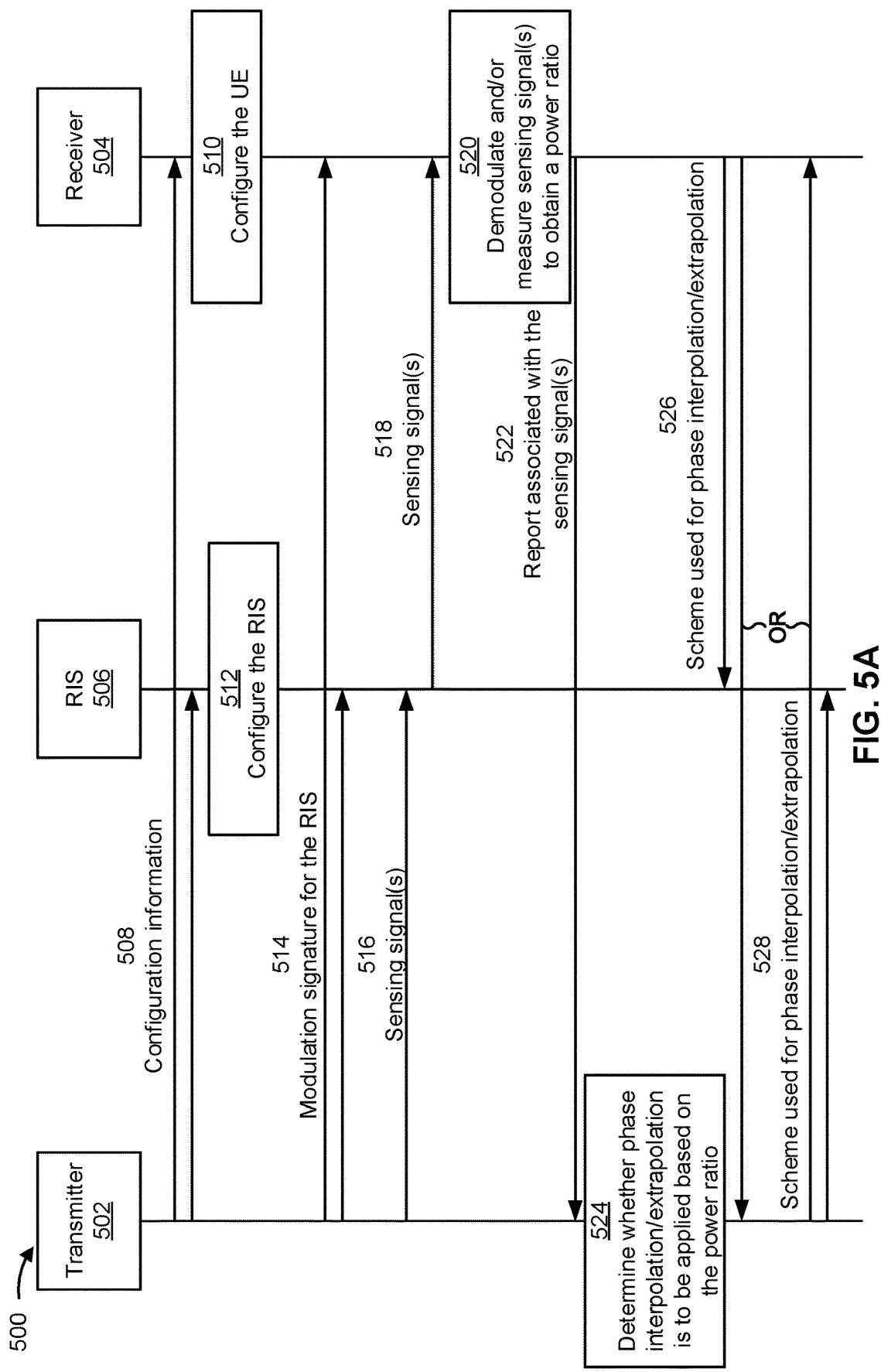
FIGS. 5A and 5B are diagrams illustrating an example associated with RIS link identification, in accordance with the present disclosure.
Figure 5B:
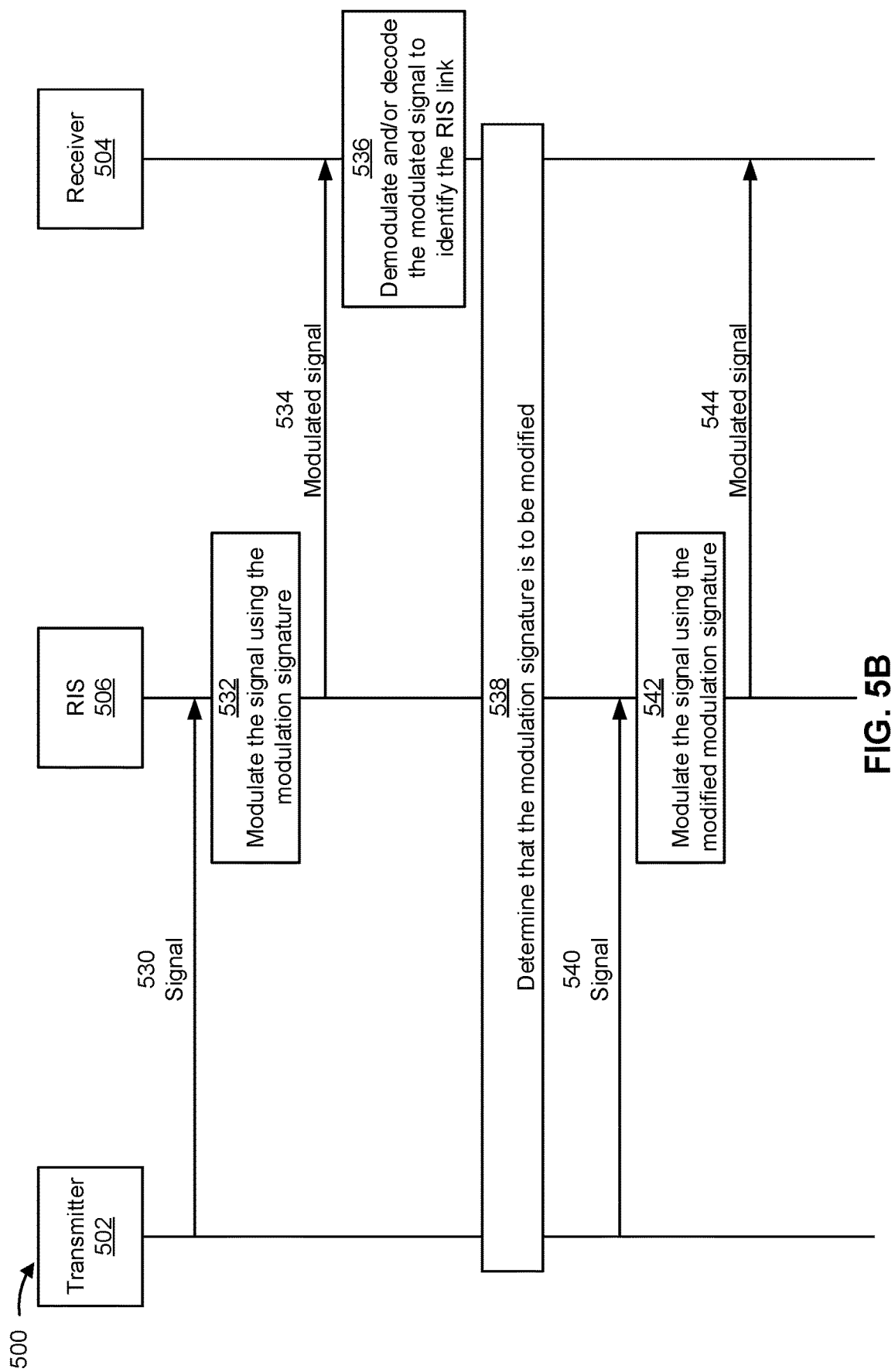

FIGS. 5A and 5B are diagrams illustrating an example 500 associated with RIS link identification, in accordance with the present disclosure. As shown in FIG. 5A, a transmitter 502 and a receiver 504 may communicate with one another in a wireless network, such as the wireless network 100. In some aspects, the transmitter 502 may be a base station 110 or a UE 120, among other examples. The receiver 504 may be a UE 120 or a base station 110, among other examples. As shown in FIGS. 5A and 5B, in some aspects, the transmitter 502 and the receiver 504 may communicate via an RIS 506. The RIS 506 may be similar to the RIS 305 described in connection with FIGS. 3 and 4.

As shown by reference number 508, the transmitter 502 may transmit, and the receiver 504 and/or the RIS 506 may receive, configuration information. In some aspects, the receiver 504 may receive configuration information from another device (e.g., from another base station or another UE). In some aspects, the receiver 504 may receive the configuration information via system information signaling, radio resource control (RRC) signaling and/or medium access control (MAC) signaling (e.g., MAC control elements (MAC-CEs)). In some aspects, the configuration information may include an indication of one or more configuration parameters (e.g., already known to the receiver 504) for selection by the receiver 504 and/or explicit configuration information for the receiver 504 to use to configure the receiver 504.

In some aspects, the configuration information may indicate that an indirect link between the transmitter 502, the RIS 506, and the receiver 504 is to be established and/or maintained. In some aspects, the configuration information may indicate a modulation signature associated with the RIS 506. For example, the modulation signature may be a phase modulation signature, a polarization modulation signature, and/or an amplitude modulation signature, among other examples. In some aspects, the configuration information may indicate a beam state or a beam direction of the RIS 506 that is associated with the modulation signature (e.g., multiple modulation signatures may be indicated for multiple beam states and/or beam directions of the RIS 506). In some aspects, the configuration information may indicate a pattern or sequence associated with the modulation signature. In some aspects, the configuration information may indicate that the RIS 506 is to modulate a signal reflected by the RIS, in accordance with the modulation signature, at symbol boundaries and/or in symbols that contain a reference signal (e.g., a DMRS, a PTRS, and/or a polarization detection reference signal). In some aspects, the configuration information may configure the reference signal that is to be associated with the signal to be reflected by the RIS 506. For example, if the modulation signature is a phase modulation signature, then the configuration information may configure DMRSs and/or PTRSs to be transmitted with the signal. Similarly, if the modulation signature is a polarization modulation signature, then the configuration information may configure polarization detection reference signals and/or other reference signals to be transmitted with the signal. The reference signals may enable the receiver 504 to identify and/or detect the modulation of the signal, as described in more detail elsewhere herein.

In some aspects, such as when the modulation signature is a phase modulation signature, the configuration information may indicate that symbols that do not include a reference signal are to be shifted in phase. For example, the configuration information may indicate that the symbols that do not include a reference signal are to be shifted in phase based at least in part on the link that includes the RIS 506 (e.g., the indirect link) being a dominant link. For example, the configuration information may indicate that a phase change of the symbols that do not include a reference signal are to be interpolated or extrapolated from a phase change of the symbols that do include a reference signal, as explained in more detail elsewhere herein.

As shown by reference number 510, the receiver 504 may configure the receiver 504 for communicating with the transmitter 502. In some aspects, the receiver 504 may configure the receiver 504 based at least in part on the configuration information. In some aspects, the receiver 504 may be configured to perform one or more operations described herein. As shown by reference number 512, the RIS 506 (and/or an RIS controller of the RIS 506) may configure the RIS 506 for communicating with the transmitter 502 and/or the receiver 504. In some aspects, the RIS 506 (and/or an RIS controller of the RIS 506) may configure the RIS 506 based at least in part on the configuration information. In some aspects, the RIS 506 may be configured to perform one or more operations described herein.

As shown by reference number 514, the transmitter 502 may transmit, and the receiver 504 and/or the RIS 506 may receive, an indication of a modulation signature associated with the RIS 506. "Modulation signature" may refer to a pattern or sequence of modulation added to a signal that is reflected or redirected by the RIS 506 to identify the RIS 506. The modulation signature may also be referred to as an RIS watermark. The modulation signature may be a phase modulation signature, a polarization modulation signature, and/or an amplitude modulation signature, among other examples. "Phase modulation signature" may refer to a pattern or sequence of phase changes or phase shifts, added to a signal that is reflected or redirected by the RIS 506, that identifies the RIS 506. "Polarization modulation signature" may refer to a pattern or sequence of polarization states (e.g., angle or polarization or polarization mode), added to a signal that is reflected or redirected by the RIS 506, that identifies the RIS 506. "Amplitude modulation signature" may refer to a pattern or sequence of amplitude changes or amplitude shifts, added to a signal that is reflected or redirected by the RIS 506, that identifies the RIS 506.

For example, for a phase modulation signature, a common phase modulation may be applied (by the RIS 506) to a signal that is reflected and/or redirected by the RIS 506. "Common phase modulation" may refer to a phase modulation that is applied by all reconfigurable elements of the RIS 506. For example, as described in more detail elsewhere herein, the RIS 506 may modulate (e.g., scramble) a signal by the phase modulation signature. A sequence or pattern of phase changes in the reflected signal may identify the RIS 506. For example, the signal may be modulated (e.g., by the RIS 506) in accordance with a pattern that identifies the RIS 506. The pattern may include phase changes that are included in a set of phase changes (e.g., a finite set of phase changes). For example, the pattern may include phase changes from a set of phase changes that includes ±90°, ±45°, and/or ±30°, among other examples. In order to minimize negative effects of inter-carrier interference or inter-symbol interference, the phase changes may be applied (e.g., by the RIS 506) on an OFDM symbol level (e.g., may be applied at OFDM symbol boundaries). For example, the modulation signature may modulate the signal (e.g., in phase) at each symbol of a set of symbols associated with the signal (e.g., to be reflected by the RIS 506) or at a subset of symbols of the set of symbols. For example, the modulation signature may modulate the signal (e.g., in phase) at symbols that include a reference signal (e.g., a DMRS or PTRS). In other words, the modulation signature may be associated with a modulation change (e.g., a phase change for a phase modulation signature) only in symbols that include a reference signal. In some aspects, the configuration information may indicate the set of symbols and/or the subset of symbols that are to be associated with the phase change. The receiver 504 may use the reference signal(s) to detect the phase modulation and/or the phase modulation signature.

For a polarization modulation signature, the RIS 506 may change a polarization of an impinging signal, in accordance with the polarization modulation signature, to identify the RIS 506. For example, the polarization of the signal reflected by the RIS 506 may be modulated (e.g., scrambled) by the polarization modulation signature. For example, a signal transmitted by the transmitter 502 may be associated with a first polarization state. The RIS 506 may modify the signal, in accordance with the polarization modulation signature, from the first polarization state of the signal as transmitted by the transmitter 502 to a second polarization state of the signal as reflected by the RIS 506. The polarization state (e.g., the first polarization state and/or the second polarization state) may include an angle of polarization (e.g., for linear polarization) or a polarization mode (e.g., the first polarization state and the second polarization state may use different polarization modes). A polarization mode may include linear polarization, circular polarization, and/or elliptical polarization, among other examples.

In order to minimize negative effects of inter-carrier interference or inter-symbol interference, the polarization changes may be applied (e.g., by the RIS 506) on an OFDM symbol level (e.g., may be applied at OFDM symbol boundaries). For example, the modulation signature may modulate the polarization of the signal at each symbol of a set of symbols associated with the signal (e.g., to be reflected by the RIS 506) or at a subset of symbols of the set of symbols. For example, the modulation signature may modulate the polarization of the signal (e.g., in phase) at symbols that include a reference signal. The reference signal may be a reference signal associated with detecting polarization changes (e.g., a polarization detection reference signal). In some aspects, the reference signal may be associated with at least two ports (e.g., two antenna ports). Additionally, the reference signal may be configured (e.g., by the transmitter 502) to be included in each symbol where a new polarization state is applied by the RIS 506. The receiver 504 may use the reference signal(s) to detect the polarization modulation and/or the polarization modulation signature. In some aspects, the configuration information may indicate the set of symbols and/or the subset of symbols that are to be associated with the polarization change.

For an amplitude modulation signature, the RIS 506 may attenuate the amplitude of the signal (e.g., to be reflected or redirected by the RIS 506) in accordance with a pattern that identifies the RIS. For example, at certain time intervals, the RIS 506 may attenuate the amplitude by turning off one or more reconfigurable elements (e.g., such that the reconfigurable elements that are turned off do not reflect or redirect the signal). For example, one or more reconfigurable elements of the RIS 506 may be tuned with a random phase to change a reflection angle (e.g., a beam direction) of the signal (e.g., the RIS 506 may point a beam direction to a null direction (e.g., toward the sky) to increase the attenuation of the signal. In some aspects, the RIS 506 attenuates the amplitude of the signal by puncturing (e.g., not reflecting or redirecting) the signal at certain time intervals in accordance with a pattern that identifies the RIS. For example, the signal, as received by the receiver 504, may be modulated (e.g., by the RIS 506) with attenuation in the amplitude of the signal (e.g., where with amplitude is reduced) or with gaps (e.g., where the amplitude is zero) where no signal is received by the receiver. The pattern or sequence of the attenuation or the gaps may identify the RIS 506. In some aspects, the RIS 506 attenuates the amplitude of the signal using spatial modulation. For example, the RIS 506 may modulate the spatial direction (e.g., the beam direction) of the signal reflected or redirected by the RIS 506. The modulation in the spatial direction of the reflected signal may cause beam misalignment at the receiver 504, which may be perceived as amplitude changes in the signal by the receiver 504. For example, the RIS 506 may add a jitter or slight variation to the spatial direction of the signal reflected or redirected by the RIS 506, causing amplitude changes of the signal at the receiver 504 in a pattern or sequence associated with the amplitude modulation signature.

In some aspects, where the phase modulation signature is used, some receivers in the wireless network may receive the signal reflected and/or redirected by the RIS 506, but may not be aware of, or may be unable to identify, the phase modulation signature. As a result, these receivers may interpret the phase modulation added by the RIS 506 as random phase noise or increased phase noise. These receivers may apply a phase noise compensation scheme to the signal (e.g., due to the received random phase noise or increased phase noise caused by the phase modulation signature) which may degrade a performance or efficiency of the signal. Therefore, the phase modulation applied by the RIS 506 should be transparent to the receivers in the wireless network that are unaware of, or are unable to identify, the phase modulation signature. In other words, based at least in part on a link associated with the RIS 506 is a dominant link (as explained in more detail elsewhere herein), the phase modulation applied by the RIS 506 should comply with, or be in accordance with, the phase noise compensation scheme used by the receivers in the wireless network.

For example, a first set of symbols of the signal may include a PTRS or a DMRS and a second set of symbols of the signal may not include a reference signal. Receivers in the wireless network that are unaware of, or are unable to identify, the phase modulation signature may be enabled to detect and compensate for phase changes in the first set of symbols using the PTRS or the DMRS. However, the RIS 506 may also apply a phase modulation of symbols in the second set of symbols (even though this phase modulation is not associated with the phase modulation signature). For example, a phase modulation of a symbol included in the second set of symbols may be interpolated or extrapolated from a phase of the signal in at least one symbol included in the first set of symbols to ensure that the phase modulation applied by the RIS 506 is transparent to those receivers (e.g., that are unaware of, or are unable to identify, the phase modulation signature). For example, where the symbol that does not include a reference signal is adjacent to a first symbol and a second symbol that both include a reference signal (e.g., is between the first symbols and the second symbol), the symbol may be modulated with an interpolated phase change that is interpolated from a phase of the first symbol and a phase of the second symbol. As another example, where the symbol that does not include a reference signal is adjacent to only one symbol that includes a reference signal, the symbol may be modulated with an extrapolated phase that is extrapolated from the phase of the one symbol that includes a reference signal. The phase change interpolation and/or extraction is depicted and described in more detail in connection with FIG. 7.

In some aspects, the transmitter 502, the receiver 504, and/or the RIS 506 may determine to apply phase modulation (e.g., interpolated and/or extrapolated phase modulation) to symbols that do not include reference signals (e.g., DMRSs and/or PTRSs) when the link that includes the RIS 506 is the dominant link. For example, in some aspects, the transmitter 502 and/or the receiver 504 may determine if the link that includes the RIS 506 is a dominant link. "Dominant link" may be a link in the wireless network between the transmitter 502 and the receiver 504 that is associated with a highest or best channel characteristic (e.g., a higher RSRP).

To identify if the link that includes the RIS 506 is a dominant link, the channel may be sensed by the transmitter 502 and/or the receiver 504. For example, as shown by reference number 516, the transmitter 502 may transmit one or more sensing signals. In some aspects, the sensing signal may include N symbols (e.g., a set of symbols). The RIS 506 may apply a sequence of orthogonal phase modulation across the N symbols of the sensing signal. As shown by reference number 518, the RIS 506 may redirect or reflect the sensing signal (e.g., with the orthogonal phase modulation applied across the N symbols of the sensing signal) to the receiver 504 (and/or receivers that are capable of communicating via the RIS 506). As shown by reference number 520, the receiver 504 may apply coherent demodulation of the sensing signal. The receiver 504 may determine or detect a power ratio associated with the sensing signal based at least in part on performing the coherent demodulation of the sensing signal. The power ratio may indicate a strength of the link associated with the RIS 506. For example, the power ratio may indicate a received power between a direct link (e.g., a direct link between the transmitter 502 and the receiver 504) and an indirect link (e.g., the link that includes the RIS 506). In some aspects, as shown by reference number 516, the transmitter 502 may transmit a sequence of symbols associated with the sensing signal in a set of repetitions. As shown by reference number 518, the RIS 506 may redirect or reflect the set of repetitions using different beam states or beam directions. For example, for a first symbol and/or a first repetition of the sensing signal, the RIS 506 may redirect or reflect the signal in a first beam direction. For a second symbol and/or a second repetition of the sensing signal, the RIS 506 may redirect or reflect the signal in a second beam direction. For a third symbol and/or a third repetition of the sensing signal, the RIS 506 may redirect or reflect the signal in a third beam direction. Therefore, the receiver 504 may receive the set of repetitions of the sensing signal, where each repetition of the set of repetitions uses a different beam direction of the RIS 506. As shown by reference number 520, the receiver 504 may measure an RSRP of the set of repetitions. As shown by reference number 522, the receiver 504 may transmit, and the transmitter 502 may receive, an indication of the RSRP of the set of repetitions (e.g., the receiver 504 may transmit a measurement report). The power ratio may be based at least in part on the RSRP of the set of repetitions. For example, the power ratio may be a ratio between a minimum RSRP measured and a difference between the minimum RSRP measured and a maximum RSRP measured (e.g., a ratio between $RSRP_{min}$ and $(RSRP_{max} - RSRP_{min})$).

The indirect link associated with the RIS 506 being the dominant link may be based at least in part on the power ratio of the sensing signal satisfying a threshold. For example, as shown by reference number 524, the transmitter 502 may determine whether phase interpolation or extrapolation (for symbols that do not include a reference signal) is to be applied based at least in part on the power ratio. Additionally, or alternatively, the RIS 506 and/or the receiver 504 may determine whether phase interpolation or extrapolation (for symbols that do not include a reference signal) is to be applied based at least in part on the power ratio. For example, if the power ratio satisfies a threshold, then phase interpolation or extrapolation (for symbols that do not include a reference signal) may be applied when the RIS 506 encodes reflected or redirected signals with the phase modulation signature. If the power ratio does not satisfy the threshold, then phase interpolation or extrapolation (for symbols that do not include a reference signal) may not be applied when the RIS 506 encodes reflected or redirected signals with the phase modulation signature.

In some aspects, the receiver 504 may identify or compensate for a phase of a symbol that does not include a reference signal using a scheme (e.g., a phase interpolation scheme, a phase extrapolation scheme, and/or a phase noise compensation scheme), such as a linear interpolation scheme, among other examples. As shown by reference number 526, the receiver 504 may transmit, and the transmitter 502 and/or the RIS 506 may receive, an indication of the scheme used by the receiver. The receiver 504 may transmit the indication of the scheme via an uplink control information message, a sidelink control information message, a physical sidelink feedback channel message, a medium access control (MAC) control element (MAC-CE) message, and/or a UE assistance information message, among other examples. The transmitter 502 and/or the RIS 506 may apply the scheme for phase modulation of signals transmitted via the indirect link that includes the RIS 506. Alternatively, as shown by reference number 528, the transmitter 502 may transmit, and the receiver 504 and/or the RIS 506 may receive, an indication of the scheme to be used by the receiver 504 (e.g., which may be the same scheme already used by the receiver 504 or a different scheme). The transmitter 502 may transmit the indication of the scheme via a radio resource control message, a system information message, a downlink control information message, a sidelink control information message, a physical sidelink feedback channel message, and/or a MAC-CE message, among other examples. The receiver 504 and the RIS 506 may apply the scheme indicated by the transmitter 502.

As shown in FIG. 5B, and by reference number 530, the transmitter 502 may transmit a signal. The signal may be a downlink signal or a sidelink signal. The signal may include a set of symbols in the time domain (e.g., a set of OFDM symbols). In some aspects, the transmitter 502 may transmit the signal in a spatial direction toward the RIS 506. The signal may be reflected or redirected by the RIS 506 to the receiver 504. As shown by reference number 532, the RIS 506 may modulate the signal (e.g., the impinging signal that arrives at the RIS 506) using the modulation signature. For example, the RIS 506 may modulate the signal in phase (e.g., for a phase modulation signature), may modulate a polarization of the signal (e.g., for a polarization modulation signature), and/or may modulate an amplitude of the signal (e.g., for an amplitude modulation signature). For example, for a phase modulation signature and/or a polarization modulation signature, the RIS 506 may modulate the signal in symbols of the signal that include a reference signal (e.g., a DMRS, a PTRS, and/or a polarization detection reference signal). For example, for a polarization modulation signature, the RIS 506 may modulate a polarization state of the signal from a first polarization state of the signal as transmitted by the transmitter 502 to a second polarization state of the signal. For an amplitude modulation signature, the RIS 506 may modulate the amplitude of the signal by attenuating the amplitude of the signal in accordance with a pattern (e.g., the amplitude modulation signature) that identifies the RIS 506. The RIS 506 may modulate the amplitude of the signal by puncturing the signal at one or more symbols of the signal, and/or by modulating a spatial direction of the signal.

As shown by reference number 534, the receiver 504 may receive a signal (e.g., a modulated signal) that is redirected or reflected by the RIS 506. The signal may be modulated by the RIS 506 using the modulation signature, as described in more detail elsewhere herein. As shown by reference number 536, the receiver 504 may demodulate and/or decode the signal (e.g., the modulated signal) to identify that the signal was transmitted via a link that includes the RIS 506. For example, the receiver 504 may detect phase changes, polarization changes, and/or amplitude changes in the signal. The receiver 504 may detect that the phase changes, polarization changes, and/or amplitude changes vary in a pattern or sequence that corresponds to the modulation signature associated with the RIS 506. Therefore, the receiver 504 may identify that the signal was reflected and/or redirected by the RIS 506.

In some aspects, the receiver 504 may identify a beam direction and/or a beam state associated with the signal based at least in part on detecting the modulation signature. For example, in some aspects, the RIS 506 may redirect or reflect signals to the receiver 504 using different beam states or beam directions (e.g., with each beam state or beam direction being associated with a different modulation signature). The receiver 504 may receive and/or measure the signals to identify a best beam state or beam direction of the RIS 506 for the receiver 504 (e.g., to identify a signal with a highest measurement value to identify a best serving beam state of the RIS 506 for the receiver 504). The receiver 504 may be enabled to differentiate between the beam states or beam directions of the RIS 506 using the different modulation signatures used by the RIS 506.

As shown by reference number 538, in some aspects, the transmitter 502, the receiver 504, and/or the RIS 506 may determine that the modulation signature of the RIS is to be modified. For example, to mitigate communication performance degradation as communication conditions change, the modulation signature of the RIS 506 may be dynamically changed based at least in part on one or more communication parameters. The one or more communication parameters may include a signal type (e.g., control signal type, data signal type, and/or pilot signal type) of a new signal (e.g., to be redirected or reflected by the RIS 506), a modulation and coding scheme, a time domain resource allocation, a frequency domain resource allocation, a Doppler spread, and/or a delay spread, among other examples. In some aspects, the RIS 506 may determine a modified modulation signature associated with the RIS 506 or may determine that the modulation signature should be changed (e.g., based at least in part on the one or more communication parameters). In some other aspects, the transmitter 502 may determine a modified modulation signature associated with the RIS 506 (e.g., based at least in part on the one or more communication parameters). The transmitter 502 may transmit, and the RIS 506 and/or the receiver 504 may receive, an indication of the modified modulation signature or a request to modify the modulation signature. In some other aspects, the receiver 504 may determine a modified modulation signature associated with the RIS 506 or may determine that the modulation signature should be changed (e.g., based at least in part on the one or more communication parameters). The receiver 504 may transmit, and the RIS 506 and/or the transmitter 502 may receive, an indication of the modified modulation signature or a request to modify the modulation signature.

As shown by reference number 540, the transmitter 502 may transmit a new signal (e.g., in a spatial direction toward the RIS 506). As shown by reference number 542, the RIS 506 may modulate the signal using the modified modulation signature (e.g., in a similar manner as described elsewhere herein). As shown by reference number 544, the RIS 506 may reflect or redirect the signal (e.g., the modulated signal) to the receiver 504. The receiver 504 may receive the signal (e.g., that is modulated using the modified modulation signature). In some aspects, the receiver 504 may decode the new signal by performing hypothesis testing of one or more candidate modulation signatures to identify the modified modulation signature. For example, the receiver 504 may not receive an indication of the modified modulation signature (e.g., as the modulation signature may be dynamically changed). Therefore, the receiver 504 may need to perform blind detection of the modified modulation signature using one or more candidate modulation signatures as hypotheses. For example, the one or more candidate modulation signatures may be indicated to the receiver 504 via the configuration information or another message.

As a result, the transmitter 502 and/or the receiver 504 may be enabled to identify and distinguish a direct link from an indirect link that is associated with the RIS 506. Therefore, the transmitter 502 and/or the receiver 504 may simultaneously maintain the direct link and the indirect link, while also treating the direct link and the indirect link separately and/or differently. This may improve communication performance and efficiency by enabling the indirect link (e.g., associated with the RIS 506) to be associated with different beam management, communication processing, and/or transmit power allocation, among other examples, than the direct link (e.g., that is directly between the transmitter 502 and the receiver 504).

As indicated above, FIGS. 5A and 5B are provided as examples. Other examples may differ from what is described with respect to FIGS. 5A and 5B.

Figure 6:
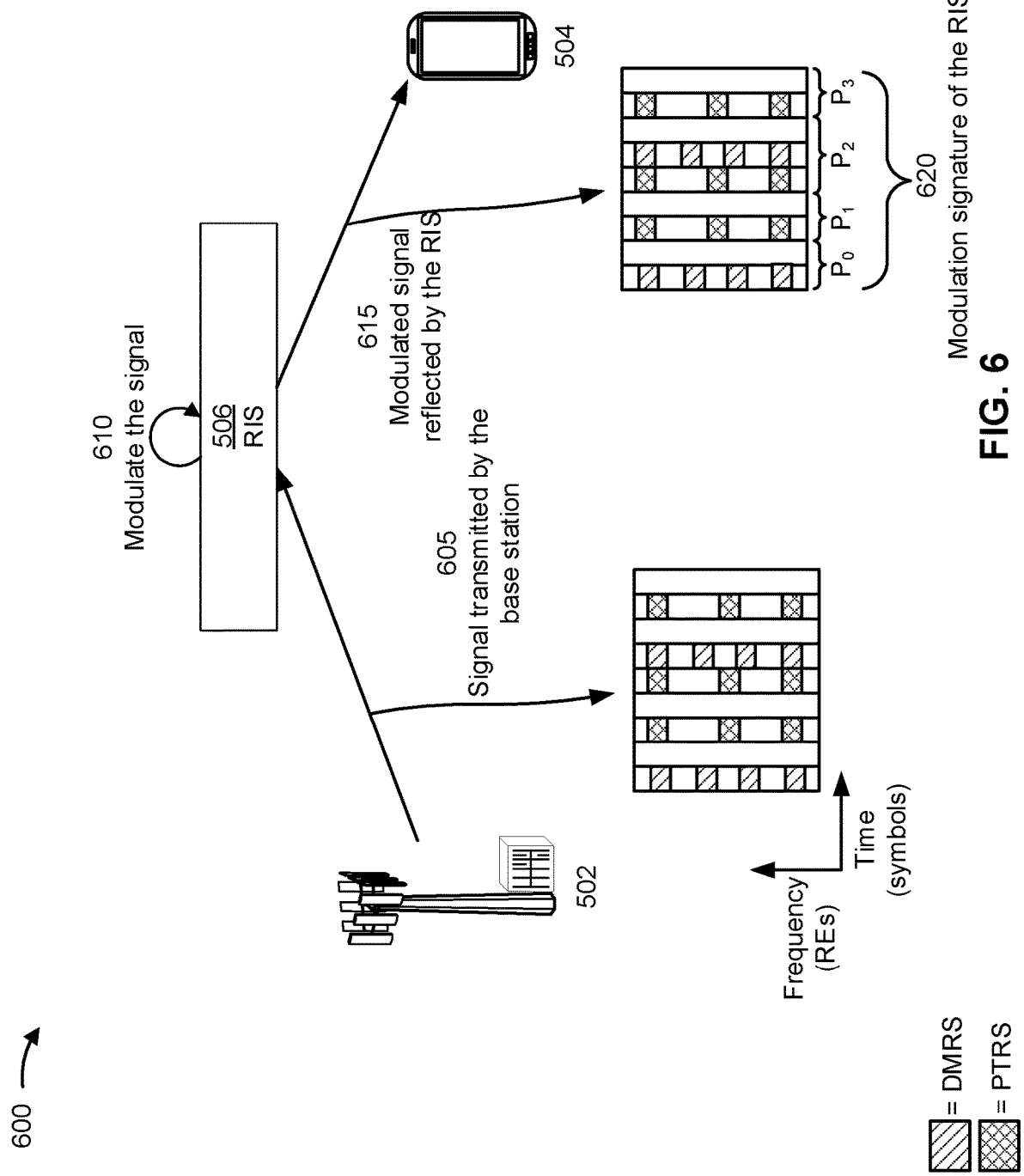
FIG. 6 is a diagram illustrating an example associated with communications reflected by an RIS using a modulation signature, in accordance with the present disclosure.

FIG. 6 is a diagram illustrating an example 600 associated with communications reflected by an RIS using a modulation signature, in accordance with the present disclosure. As shown in FIG. 6, example 600 includes communication between the transmitter 502 (shown as a base station) and the receiver 504 (shown as a UE). In some aspects, the transmitter 502 and the receiver 504 may be included in a wireless network, such as wireless network 100. The transmitter 502 and the receiver 504 may communicate via a wireless access link, which may be an indirect link that includes the RIS 506. As shown in FIG. 6, the modulation signature may be a phase modulation signature.

As shown by reference number 605, the transmitter 502 may transmit a signal. The signal may include a set of symbols (e.g., in the time domain) and a set of resource elements (REs) (e.g., in the frequency domain). As shown in FIG. 6, one or more symbols of the signal may include REs that are associated with a reference signal, such as a DMRS or a PTRS. In some aspects, one or more symbols of the signal may not include any reference signals.

As shown by reference number 610, the RIS 506 may modulate the signal (e.g., an impinging signal) using the modulation signature (e.g., the phase modulation signature). For example, reconfigurable elements of the RIS 506 may be configured to modulate or change the phase of the signal over time in accordance with a sequence or pattern that identifies the RIS 506. As shown by reference number 615, the RIS 506 may reflect or redirect a modulated signal in a spatial direction toward the receiver 504. For example, the modulated signal may be modulated in phase over time. For example, a first two symbols of the modulated signal may have a first phase (e.g., $P_0$), a next two symbols of the modulated signal may have a second phase (e.g., $P_1$), a next three symbols of the modulated signal may have a third phase (e.g., $P_2$), and a last two symbols of the modulated signal may have a fourth phase (e.g., $P_3$). As shown by reference number 620, the sequence or pattern of the first phase, the second phase, the third phase, and the fourth phase may be the modulation signature of the RIS 506. For example, when the receiver 504 detects the modulation signature (e.g., the phase modulation signature), the receiver 504 may identify that the signal has been redirected or reflected by the RIS 506. This may enable the receiver 504 to identify and differentiate between a link that is associated with the RIS 506 and a direct link with the transmitter 502.

As indicated above, FIG. 6 is provided as an example. Other examples may differ from what is described with respect to FIG. 6.

Figure 7:
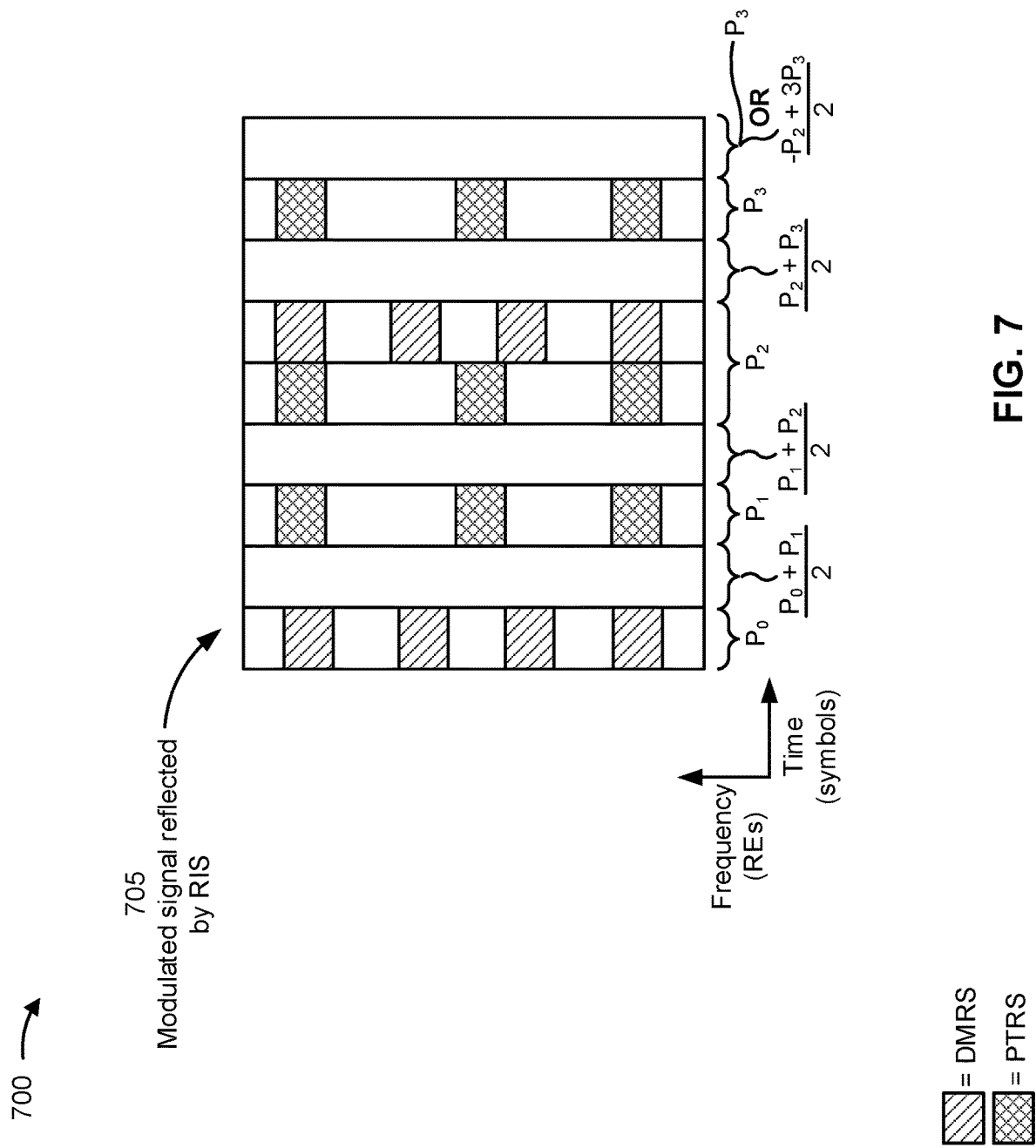
FIG. 7 is a diagram illustrating an example associated with phase noise compensation for a signal modulated by an RIS using a modulation signature, in accordance with the present disclosure.

FIG. 7 is a diagram illustrating an example 700 associated with phase noise compensation for a signal modulated by an RIS using a modulation signature, in accordance with the present disclosure. As shown in FIG. 7, and by reference number 705, a signal reflected or redirected by an RIS (e.g., the RIS 506) may be modulated in phase (e.g., by a phase modulation signature), as described in more detail elsewhere herein.

In some aspects, the phase modulation signature may change a phase of symbols of the signal that include a reference signal (e.g., a DMRS or a PTRS). However, to compensate for what would otherwise be interpreted as phase noise by receivers who are not capable of identifying the phase modulation signature, symbols of the signal that do not include a reference signal may also be modulated in phase. For example, a first set of symbols of the signal may include a PTRS or a DMRS and a second set of symbols of the signal may not include a reference signal. A phase modulation of a symbol included in the second set of symbols may be interpolated or extrapolated from a phase of the signal in at least one symbol included in the first set of symbols. For example, the second symbol of the signal may not include a reference signal. As shown in FIG. 7, the second symbol may be adjacent to two symbols (e.g., the first symbol and the third symbol) that do include reference signals. Therefore, a phase of the second symbol may be interpolated from a phase of the first symbol (e.g., $P_0$) and a phase of the third symbol (e.g., $P_1$). For example, if linear interpolation is used, the phase of the second symbol may be represented as $$\frac{P_0 + P_1}{2}.$$

Similarly, for the fourth symbol, the phase of the fourth symbol may be interpolated from a phase of the third symbol (e.g., $P_1$) and a phase of the fifth symbol (e.g., $P_2$). For example, if linear interpolation is used, the phase of the fourth symbol may be represented as $$\frac{P_1 + P_2}{2}.$$

For a symbol that is adjacent to only one other symbol that includes a reference signal, such as the last symbol of the signal, the phase of the symbol may be the same as the phase of the adjacent symbol or may be extrapolated from the phase of the adjacent symbol and/or other symbols of the signal. For example, as shown in FIG. 7, the last symbol may be located after a symbol that includes a reference signal. As another example, the symbol could be a first symbol of the signal that is located prior to a symbol (e.g., that includes a reference signal) in the time domain. The phase of the last symbol of the signal may be the same as the phase of the symbol adjacent to the last signal (e.g., $P_3$) or may be extrapolated from the symbol adjacent to the last signal and other symbols included in the signal (e.g., $$\left(e.g., \frac{-P_2 + 3P_3}{2}\right).$$

In this way, the phase modulation signature may still be indicated or encoded in the signal (e.g., in the symbols that include a reference signal) while the phase changes across the signal can be compensated for in symbols that do not include a reference signal. In other words, phase changes across the signal, caused by the phase modulation signature, may be smoothed or lessened. This may result in improved performance for receivers that are unable to, or are not capable of, identifying the phase modulation signature. For example, the phase changes across the signal may be interpolated and/or extrapolated in a similar manner as would be applied by a receiver (e.g., regardless of whether the signal included the phase modulation signature). Therefore, the receivers that are unable to, or are not capable of, identifying the phase modulation signature may see no impact to communication performance of the signal that includes or is encoded using the phase modulation signature.

As indicated above, FIG. 7 is provided as an example. Other examples may differ from what is described with respect to FIG. 7.

FIG. 8 is a diagram illustrating an example process 800 performed, for example, by a receiver, in accordance with the present disclosure. Example process 800 is an example where the receiver (e.g., receiver 504, UE 120, and/or base station 110) performs operations associated with RIS link identification.

As shown in FIG. 8, in some aspects, process 800 may include receiving, from a transmitter, an indication of a modulation signature associated with an RIS (block 810). For example, the receiver (e.g., using communication manager 140 and/or reception component 1102, depicted in FIG. 11) may receive, from a transmitter, an indication of a modulation signature associated with a reconfigurable intelligent surface (RIS), as described above.

As further shown in FIG. 8, in some aspects, process 800 may include receiving a signal that uses the modulation signature, wherein the modulation signature identifies a link associated with the RIS and the transmitter (block 820). For example, the receiver (e.g., using communication manager 140 and/or reception component 1102, depicted in FIG. 11) may receive a signal that uses the modulation signature, wherein the modulation signature identifies a link associated with the RIS and the transmitter, as described above.

Process 800 may include additional aspects, such as any single aspect or any combination of aspects described below and/or in connection with one or more other processes described elsewhere herein.

In a first aspect, the modulation signature is at least one of a phase modulation signature, a polarization modulation signature, or an amplitude modulation signature.

In a second aspect, alone or in combination with the first aspect, the signal is redirected by the RIS from the transmitter to the receiver, and the modulation signature modulates the signal at each symbol of a set of symbols associated with the signal or at a subset of symbols of the set of symbols.

In a third aspect, alone or in combination with one or more of the first and second aspects, the modulation signature is a phase modulation signature or a polarization modulation signature, and receiving the signal that uses the modulation signature includes detecting a modulation associated with the signal using a reference signal included in the signal, where the reference signal is included in a symbol of the signal associated with a modulation change of the signal, and where the reference signal is a phase tracking reference signal or a polarization detection reference signal.

In a fourth aspect, alone or in combination with one or more of the first through third aspects, the modulation signature is the polarization modulation signature and the reference signal is the polarization detection reference signal, and the reference signal is associated with at least two ports.

In a fifth aspect, alone or in combination with one or more of the first through fourth aspects, the modulation signature is a phase modulation signature, and the signal is modulated in phase in accordance with a pattern that identifies the RIS, where the pattern includes phase changes that are included in a set of phase changes.

In a sixth aspect, alone or in combination with one or more of the first through fifth aspects, the modulation signature is a polarization modulation signature, the polarization modulation signature modifies a polarization state of the signal from a first polarization state of the signal as transmitted by the transmitter to a second polarization state of the signal as reflected by the RIS, and the polarization state includes an angle of polarization or a polarization mode.

In a seventh aspect, alone or in combination with one or more of the first through sixth aspects, the modulation signature is an amplitude modulation signature, and the amplitude modulation signature attenuates the amplitude of the signal in accordance with a pattern that identifies the RIS.

In an eighth aspect, alone or in combination with one or more of the first through seventh aspects, the amplitude modulation signature attenuates the amplitude of the signal by puncturing the signal at one or more symbols or by modulating a spatial direction of the signal.

In a ninth aspect, alone or in combination with one or more of the first through eighth aspects, receiving the indication of the modulation signature associated with the RIS includes receiving the indication of the modulation signature associated with the RIS via at least one of a system information message, a radio resource control message, or a MAC-CE message.

In a tenth aspect, alone or in combination with one or more of the first through ninth aspects, the modulation signature identifies the RIS and a beam state or beam direction associated with the RIS.

In an eleventh aspect, alone or in combination with one or more of the first through tenth aspects, process 800 includes receiving a new signal using a modified modulation signature associated with the RIS, where the modified modulation signature is based at least in part on a communication parameter.

In a twelfth aspect, alone or in combination with one or more of the first through eleventh aspects, the communication parameter includes at least one of a signal type of the new signal, a modulation and coding scheme, a time domain resource allocation, a frequency domain resource allocation, a Doppler spread, or a delay spread.

In a thirteenth aspect, alone or in combination with one or more of the first through twelfth aspects, process 800 includes decoding the new signal by performing hypothesis testing of one or more candidate modulation signatures to identify the modified modulation signature.

In a fourteenth aspect, alone or in combination with one or more of the first through thirteenth aspects, the modulation signature is a phase modulation signature, and a first set of symbols of the signal include a phase tracking reference signal or a demodulation reference signal and a second set of symbols of the signal do not include a reference signal, and a phase modulation of a symbol included in the second set of symbols is interpolated or extrapolated from a phase of the signal in at least one symbol included in the first set of symbols.

In a fifteenth aspect, alone or in combination with one or more of the first through fourteenth aspects, the modulation signature is a phase modulation signature, a first set of symbols of the signal include a phase tracking reference signal or a demodulation reference signal and a second set of symbols of the signal do not include a reference signal, and receiving the signal using the modulation signature includes decoding the signal by identifying a first phase of the signal in at least one symbol of the first set of symbols using a phase tracking reference signal or a demodulation reference signal and by identifying a second phase of the signal in a symbol of the second set of symbols by interpolating or extrapolating the second phase from the first phase.

In a sixteenth aspect, alone or in combination with one or more of the first through fifteenth aspects, the at least one symbol of the first set of symbols includes a first symbol and a second symbol, the symbol of the second set of symbols is adjacent to the first symbol and the second symbol, and the second phase is interpolated from a third phase of the first symbol and a fourth phase of the second symbol.

In a seventeenth aspect, alone or in combination with one or more of the first through sixteenth aspects, the at least one symbol of the first set of symbols includes a first symbol, the symbol of the second set of symbols is located prior to or after the first symbol in a time domain, and the second phase is extrapolated from a third phase of the first symbol.

In an eighteenth aspect, alone or in combination with one or more of the first through seventeenth aspects, symbols included in the second set of symbols are modulated in phase based at least in part on the link associated with the RIS and the transmitter being a dominant link, and the link associated with the RIS and the transmitter being the dominant link is based at least in part on a power ratio of the signal satisfying a threshold.

In a nineteenth aspect, alone or in combination with one or more of the first through eighteenth aspects, process 800 includes receiving a sensing signal that includes a set of symbols, the set of symbols modulated in phase by the RIS using a sequence of orthogonal phase modulation across the set of symbols, and demodulating the sensing signal to identify the power ratio of the signal.

In a twentieth aspect, alone or in combination with one or more of the first through nineteenth aspects, process 800 includes receiving a set of repetitions of a sensing signal, where each repetition of the set of repetitions uses a different beam direction of the RIS, measuring an RSRP of the set of repetitions, and transmitting, to the transmitter, an indication of the RSRP of the set of repetitions, where the power ratio is based at least in part on the RSRP of the set of repetitions.

In a twenty-first aspect, alone or in combination with one or more of the first through twentieth aspects, the second phase of the signal in the symbol of the second set of symbols is identified using a scheme, and process 800 includes transmitting, to the transmitter, an indication of the scheme used by the receiver via at least one of an uplink control information message, a sidelink control information message, a physical sidelink feedback channel message, a MAC-CE message, or a user equipment assistance information message.

In a twenty-second aspect, alone or in combination with one or more of the first through twenty-first aspects, the second phase of the signal in the symbol of the second set of symbols is identified using a scheme, and process 800 includes receiving, from the transmitter, an indication of the scheme to be used by the receiver via at least one of a radio resource control message, a system information message, a downlink control information message, a sidelink control information message, a physical sidelink feedback channel message, or a MAC-CE message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a transmitter, in accordance with the present disclosure. Example process 900 is an example where the transmitter (e.g., transmitter 502, base station 110, and/or UE 120) performs operations associated with RIS link identification.

As shown in FIG. 9, in some aspects, process 900 may include transmitting, to a receiver, an indication of a modulation signature associated with an RIS (block 910). For example, the transmitter (e.g., using communication manager 150 and/or transmission component 1204, depicted in FIG. 12) may transmit, to a receiver, an indication of a modulation signature associated with an RIS, as described above.

As further shown in FIG. 9, in some aspects, process 900 may include transmitting a signal that is reflected by the RIS to the receiver, wherein the RIS redirects the signal using the modulation signature, and wherein the modulation signature identifies a link associated with the RIS and the transmitter (block 920). For example, the transmitter (e.g., using communication manager 150 and/or transmission component 1204, depicted in FIG. 12) may transmit a signal that is reflected by the RIS to the receiver, wherein the RIS redirects the signal using the modulation signature, and wherein the modulation signature identifies a link associated with the RIS and the transmitter, as described above.

Process 900 may include additional aspects, such as any single aspect or any combination of aspects described below and/or in connection with one or more other processes described elsewhere herein.

In a first aspect, the modulation signature is at least one of a phase modulation signature, a polarization modulation signature, or an amplitude modulation signature.

In a second aspect, alone or in combination with the first aspect, the signal is redirected by the RIS from the transmitter to the receiver, and the modulation signature modulates the signal at each symbol of a set of symbols associated with the signal or at a subset of symbols of the set of symbols.

In a third aspect, alone or in combination with one or more of the first and second aspects, the modulation signature is a phase modulation signature or a polarization modulation signature, and transmitting the signal that uses the modulation signature includes transmitting the signal including a reference signal, where the reference signal is included in a symbol of the signal associated with a modulation change of the signal, and where the reference signal is a phase tracking reference signal or a polarization detection reference signal.

In a fourth aspect, alone or in combination with one or more of the first through third aspects, the modulation signature is the polarization modulation signature and the reference signal is the polarization detection reference signal, and the reference signal is associated with at least two ports.

In a fifth aspect, alone or in combination with one or more of the first through fourth aspects, the modulation signature is a polarization modulation signature, the polarization modulation signature modifies a polarization state of the signal from a first polarization state of the signal as transmitted by the transmitter to a second polarization state of the signal as reflected by the RIS, and the polarization state includes an angle of polarization or a polarization mode.

In a sixth aspect, alone or in combination with one or more of the first through fifth aspects, the modulation signature is an amplitude modulation signature, where the amplitude modulation signature attenuates the amplitude of the signal in accordance with a pattern that identifies the RIS.

In a seventh aspect, alone or in combination with one or more of the first through sixth aspects, the amplitude modulation signature attenuates the amplitude of the signal by puncturing the signal at one or more symbols or by modulating a spatial direction of the signal.

In an eighth aspect, alone or in combination with one or more of the first through seventh aspects, transmitting the indication of the modulation signature associated with the RIS includes transmitting the indication of the modulation signature associated with the RIS via at least one of a system information message, a radio resource control message, or a MAC-CE message.

In a ninth aspect, alone or in combination with one or more of the first through eighth aspects, the modulation signature identifies the RIS and a beam state or beam direction associated with the RIS.

In a tenth aspect, alone or in combination with one or more of the first through ninth aspects, process 900 includes transmitting a new signal, where the new signal is redirected by the RIS using a modified modulation signature associated with the RIS, where the modified modulation signature is based at least in part on a communication parameter.

In an eleventh aspect, alone or in combination with one or more of the first through tenth aspects, the communication parameter includes at least one of a signal type of the new signal, a modulation and coding scheme, a time domain resource allocation, a frequency domain resource allocation, a Doppler spread, or a delay spread.

In a twelfth aspect, alone or in combination with one or more of the first through eleventh aspects, the modulation signature is a phase modulation signature, a first set of symbols of the signal include a phase tracking reference signal or a demodulation reference signal and a second set of symbols of the signal do not include a reference signal, and a phase modulation of a symbol included in the second set of symbols is interpolated or extrapolated from a phase of the signal in at least one symbol included in the first set of symbols.

In a thirteenth aspect, alone or in combination with one or more of the first through twelfth aspects, symbols included in the second set of symbols are modulated in phase based at least in part on the link associated with the RIS and the transmitter being a dominant link, where the link associated with the RIS and the transmitter being the dominant link is based at least in part on a power ratio of the signal satisfying a threshold.

In a fourteenth aspect, alone or in combination with one or more of the first through thirteenth aspects, process 900 includes transmitting a sensing signal that includes a set of symbols, the set of symbols modulated in phase by the RIS using a sequence of orthogonal phase modulation across the set of symbols, and the power ratio is based at least in part on a demodulation of the signal.

In a fifteenth aspect, alone or in combination with one or more of the first through fourteenth aspects, process 900 includes transmitting a set of repetitions of a sensing signal, where each repetition of the set of repetitions is redirected by the RIS using a different beam direction of the RIS, and receiving, from the receiver, an indication of an RSRP of the set of repetitions, where the power ratio is based at least in part on the RSRP of the set of repetitions.

In a sixteenth aspect, alone or in combination with one or more of the first through fifteenth aspects, the phase modulating of the signal in the symbol of the second set of symbols is identified using a scheme, and process 900 includes receiving, from the receiver, an indication of the scheme used by the receiver via at least one of an uplink control information message, a sidelink control information message, a physical sidelink feedback channel message, a MAC-CE message, or a user equipment assistance information message.

In a seventeenth aspect, alone or in combination with one or more of the first through sixteenth aspects, the phase modulation of the signal in the symbol of the second set of symbols is identified using a scheme, and process 900 includes transmitting, from the receiver, an indication of the scheme to be used by the receiver via at least one of a radio resource control message, a system information message, a downlink control information message, a sidelink control information message, a physical sidelink feedback channel message, or a MAC-CE message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by an RIS, in accordance with the present disclosure. Example process 1000 is an example where the RIS (e.g., RIS 506) performs operations associated with RIS link identification.

As shown in FIG. 10, in some aspects, process 1000 may include receiving, from a transmitter, an indication of a modulation signature associated with the RIS (block 1010). For example, the RIS (e.g., using communication manager 170 and/or reception component 1302, depicted in FIG. 13) may receive, from a transmitter, an indication of a modulation signature associated with the RIS, as described above.

As further shown in FIG. 10, in some aspects, process 1000 may include receiving, from the transmitter, a signal (block 1020). For example, the RIS (e.g., using communication manager 170 and/or reception component 1302, depicted in FIG. 13) may receive, from the transmitter, a signal, as described above.

As further shown in FIG. 10, in some aspects, process 1000 may include redirecting the signal using the modulation signature, wherein the modulation signature identifies a link associated with the RIS and the transmitter (block 1030). For example, the RIS (e.g., using communication manager 170 and/or reflection component 1308, depicted in FIG. 13) may redirect the signal using the modulation signature, wherein the modulation signature identifies a link associated with the RIS and the transmitter, as described above.

Process 1000 may include additional aspects, such as any single aspect or any combination of aspects described below and/or in connection with one or more other processes described elsewhere herein.

In a first aspect, the modulation signature is at least one of a phase modulation signature, a polarization modulation signature, or an amplitude modulation signature.

In a second aspect, alone or in combination with the first aspect, the modulation signature modulates the signal at each symbol of a set of symbols associated with the signal or at a subset of symbols of the set of symbols.

In a third aspect, alone or in combination with one or more of the first and second aspects, the modulation signature is a phase modulation signature or a polarization modulation signature, and redirecting the signal includes modulating the signal in symbols that include a reference signal, where the reference signal is a phase tracking reference signal or a polarization detection reference signal.

In a fourth aspect, alone or in combination with one or more of the first through third aspects, the modulation signature is a polarization modulation signature, and the redirecting the signal includes modulating a polarization state of the signal from a first polarization state of the signal as transmitted by the transmitter to a second polarization state of the signal, where the polarization state includes an angle of polarization or a polarization mode.

In a fifth aspect, alone or in combination with one or more of the first through fourth aspects, the modulation signature is an amplitude modulation signature, and redirecting the signal includes modulating the amplitude of the signal by attenuating the amplitude of the signal in accordance with a pattern that identifies the RIS.

In a sixth aspect, alone or in combination with one or more of the first through fifth aspects, modulating the amplitude of the signal comprises puncturing the signal at one or more symbols of the signal, or modulating a spatial direction of the signal.

In a seventh aspect, alone or in combination with one or more of the first through sixth aspects, receiving the indication of the modulation signature associated with the RIS includes receiving the indication of the modulation signature associated with the RIS via at least one of a system information message, a radio resource control message, or a MAC-CE message.

In an eighth aspect, alone or in combination with one or more of the first through seventh aspects, the modulation signature identifies the RIS and a beam state or beam direction associated with the RIS.

In a ninth aspect, alone or in combination with one or more of the first through eighth aspects, process 1000 includes receiving, from the transmitter, a new signal, and redirecting the new signal using a modified modulation signature associated with the RIS, where the modified modulation signature is based at least in part on a communication parameter.

In a tenth aspect, alone or in combination with one or more of the first through ninth aspects, the communication parameter includes at least one of a signal type of the new signal, a modulation and coding scheme, a time domain resource allocation, a frequency domain resource allocation, a Doppler spread, or a delay spread.

In an eleventh aspect, alone or in combination with one or more of the first through tenth aspects, the modulation signature is a phase modulation signature, a first set of symbols of the signal include a phase tracking reference signal or a demodulation reference signal and a second set of symbols of the signal do not include a reference signal, and a phase modulation of a symbol included in the second set of symbols is interpolated or extrapolated from a phase of the signal in at least one symbol included in the first set of symbols.

In a twelfth aspect, alone or in combination with one or more of the first through eleventh aspects, the modulation signature is a phase modulation signature, a first set of symbols of the signal include a phase tracking reference signal or a demodulation reference signal and a second set of symbols of the signal do not include a reference signal, and redirecting the signal includes modulating the signal by a first phase change in at least one symbol of the first set of symbols, and modulating the signal by a second phase change in a symbol of the second set of symbols by interpolating or extrapolating the second phase change from the first phase change.

In a thirteenth aspect, alone or in combination with one or more of the first through twelfth aspects, the at least one symbol of the first set of symbols include a first symbol and a second symbol, and the symbol of the second set of symbols is adjacent to the first symbol and the second symbol, where the second phase change is interpolated from a third phase change of the first symbol and a fourth phase change of the second symbol.

In a fourteenth aspect, alone or in combination with one or more of the first through thirteenth aspects, the at least one symbol of the first set of symbols includes a first symbol, the symbol of the second set of symbols is located prior to or after the first symbol in a time domain, and the second phase change is extrapolated from a third phase change of the first symbol.

In a fifteenth aspect, alone or in combination with one or more of the first through fourteenth aspects, symbols included in the second set of symbols are modulated in phase based at least in part on the link associated with the RIS and the transmitter being a dominant link, and the link associated with the RIS and the transmitter being the dominant link is based at least in part on a power ratio of the signal satisfying a threshold.

In a sixteenth aspect, alone or in combination with one or more of the first through fifteenth aspects, process 1000 includes receiving, from the transmitter, a sensing signal that includes a set of symbols, and modulating the set of symbols in phase using a sequence of orthogonal phase modulation across the set of symbols.

In a seventeenth aspect, alone or in combination with one or more of the first through sixteenth aspects, process 1000 includes receiving, from the transmitter, a set of repetitions of a sensing signal, and redirecting the set of repetitions, where each repetition of the set of repetitions uses a different beam direction of the RIS.

In an eighteenth aspect, alone or in combination with one or more of the first through seventeenth aspects, the second phase change of the signal in the symbol of the second set of symbols is identified using a scheme, and process 1000 includes receiving, from the receiver, an indication of the scheme used by the receiver via at least one of an uplink control information message, a sidelink control information message, a physical sidelink feedback channel message, a MAC-CE message, or a user equipment assistance information message.

In a nineteenth aspect, alone or in combination with one or more of the first through eighteenth aspects, the second phase change of the signal in the symbol of the second set of symbols is identified using a scheme, and process 1000 includes receiving, from the transmitter, an indication of the scheme to be used by the receiver via at least one of a radio resource control message, a system information message, a downlink control information message, a sidelink control information message, a physical sidelink feedback channel message, or a MAC-CE message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
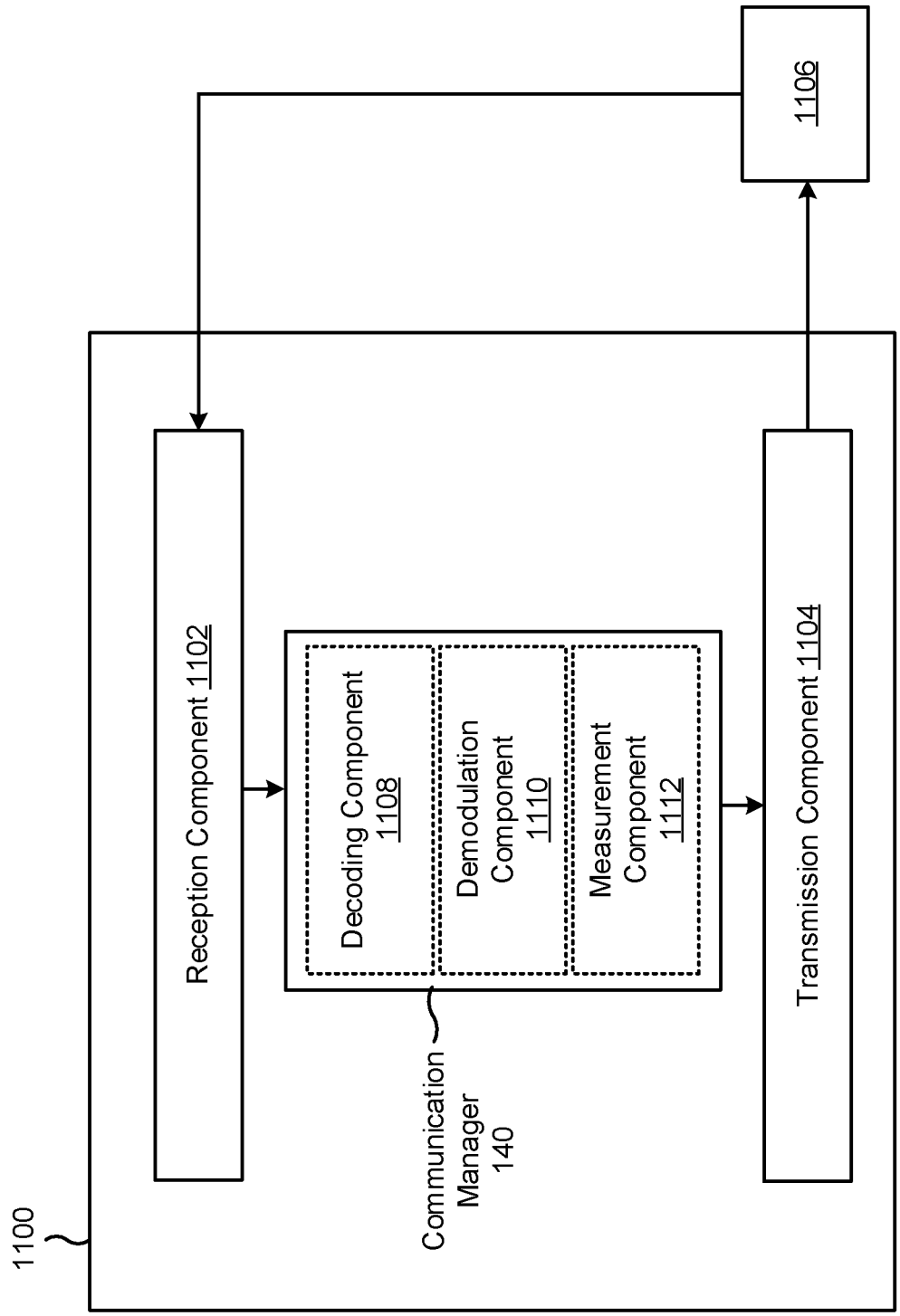
FIGS. 11-13 are diagrams of example apparatuses for wireless communication, in accordance with the present disclosure.

FIG. 11 is a diagram of an example apparatus 1100 for wireless communication. The apparatus 1100 may be a receiver, or a receiver may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a decoding component 1108, a demodulation component 1110, and/or a measurement component 1112, among other examples.

In some aspects, the apparatus 1100 may be configured to perform one or more operations described herein in connection with FIGS. 5A, 5B, 6, and 7. Additionally, or alternatively, the apparatus 1100 may be configured to perform one or more processes described herein, such as process 800 of FIG. 8, or a combination thereof. In some aspects, the apparatus 1100 and/or one or more components shown in FIG. 11 may include one or more components of the receiver described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the receiver described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the receiver described in connection with FIG. 2. In some aspects, the transmission component 1104 may be co-located with the reception component 1102 in a transceiver.

The reception component 1102 may receive, from a transmitter, an indication of a modulation signature associated with an RIS. The reception component 1102 may receive a signal that uses the modulation signature, wherein the modulation signature identifies a link associated with the RIS and the transmitter.

The reception component 1102 may receive a new signal using a modified modulation signature associated with the RIS, wherein the modified modulation signature is based at least in part on a communication parameter.

The decoding component 1108 may decode the new signal by performing hypothesis testing of one or more candidate modulation signatures to identify the modified modulation signature.

The reception component 1102 may receive a sensing signal that includes a set of symbols, wherein the set of symbols is modulated in phase by the RIS using a sequence of orthogonal phase modulation across the set of symbols. The demodulation component 1110 may demodulate the sensing signal to identify the power ratio of the signal.

The reception component 1102 may receive a set of repetitions of a sensing signal, wherein each repetition of the set of repetitions uses a different beam direction of the RIS. The measurement component 1112 may measure an RSRP of the set of repetitions. The transmission component 1104 may transmit, to the transmitter, an indication of the RSRP of the set of repetitions, wherein the power ratio is based at least in part on the RSRP of the set of repetitions.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
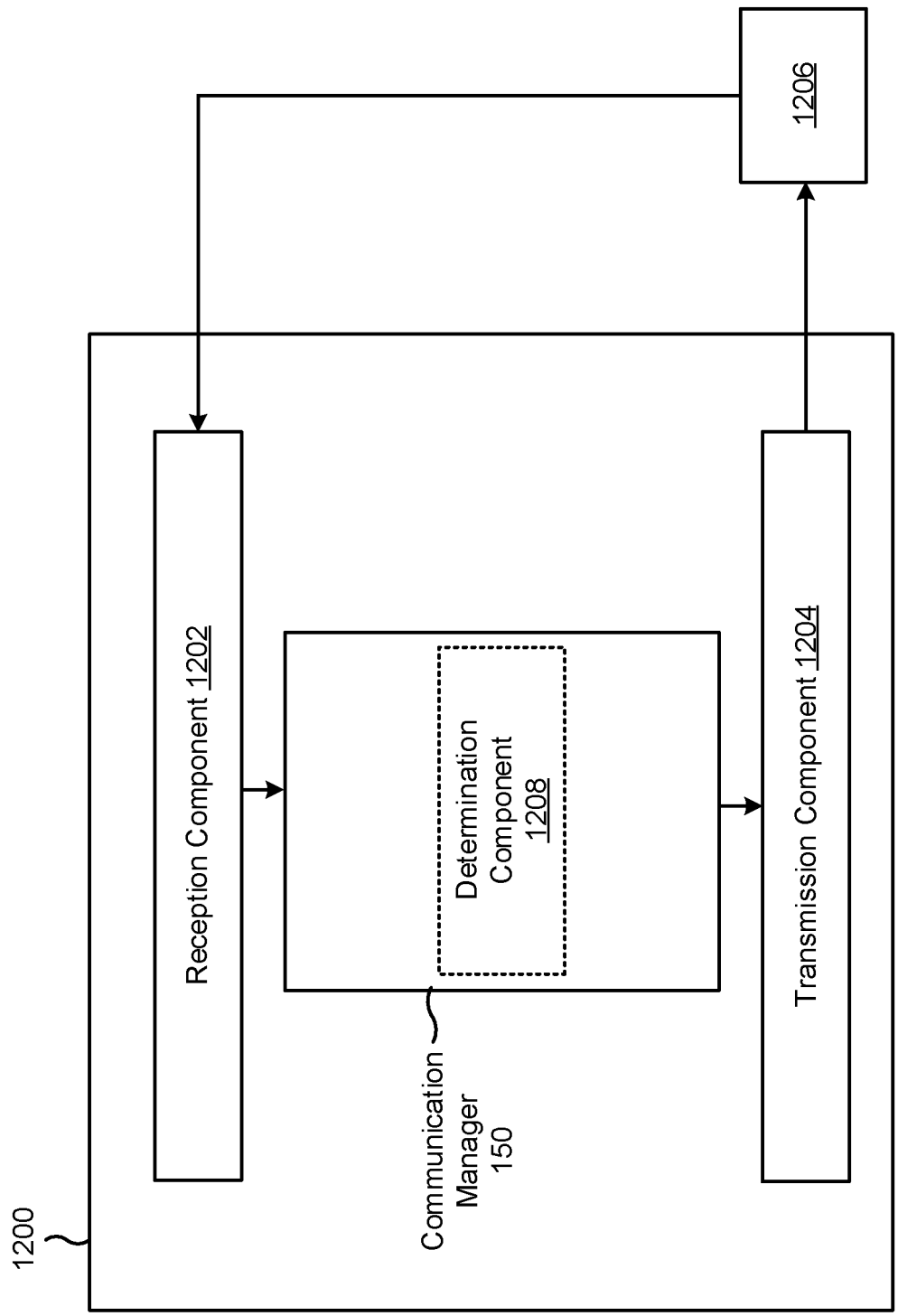

FIG. 12 is a diagram of an example apparatus 1200 for wireless communication. The apparatus 1200 may be a transmitter, or a transmitter may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIGS. 5A, 5B, 6, and 7. Additionally, or alternatively, the apparatus 1200 may be configured to perform one or more processes described herein, such as process 900 of FIG. 9, or a combination thereof. In some aspects, the apparatus 1200 and/or one or more components shown in FIG. 12 may include one or more components of the transmitter described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the transmitter described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the transmitter described in connection with FIG. 2. In some aspects, the transmission component 1204 may be co-located with the reception component 1202 in a transceiver.

The transmission component 1204 may transmit, to a receiver, an indication of a modulation signature associated with an RIS. The transmission component 1204 may transmit a signal that is reflected by the RIS to the receiver, wherein the RIS redirects the signal using the modulation signature, and wherein the modulation signature identifies a link associated with the RIS and the transmitter.

The transmission component 1204 may transmit a new signal, wherein the new signal is redirected by the RIS using a modified modulation signature associated with the RIS, wherein the modified modulation signature is based at least in part on a communication parameter.

The transmission component 1204 may transmit a sensing signal that includes a set of symbols, wherein the set of symbols is modulated in phase by the RIS using a sequence of orthogonal phase modulation across the set of symbols, wherein the power ratio is based at least in part on a demodulation of the signal.

The transmission component 1204 may transmit a set of repetitions of a sensing signal, wherein each repetition of the set of repetitions is redirected by the RIS using a different beam direction of the RIS.

The reception component 1202 may receive, from the receiver, an indication of an RSRP of the set of repetitions, wherein the power ratio is based at least in part on the RSRP of the set of repetitions. The determination component 1208 may determine that phase interpolation or extrapolation is to be applied based at least in part on the power ratio.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
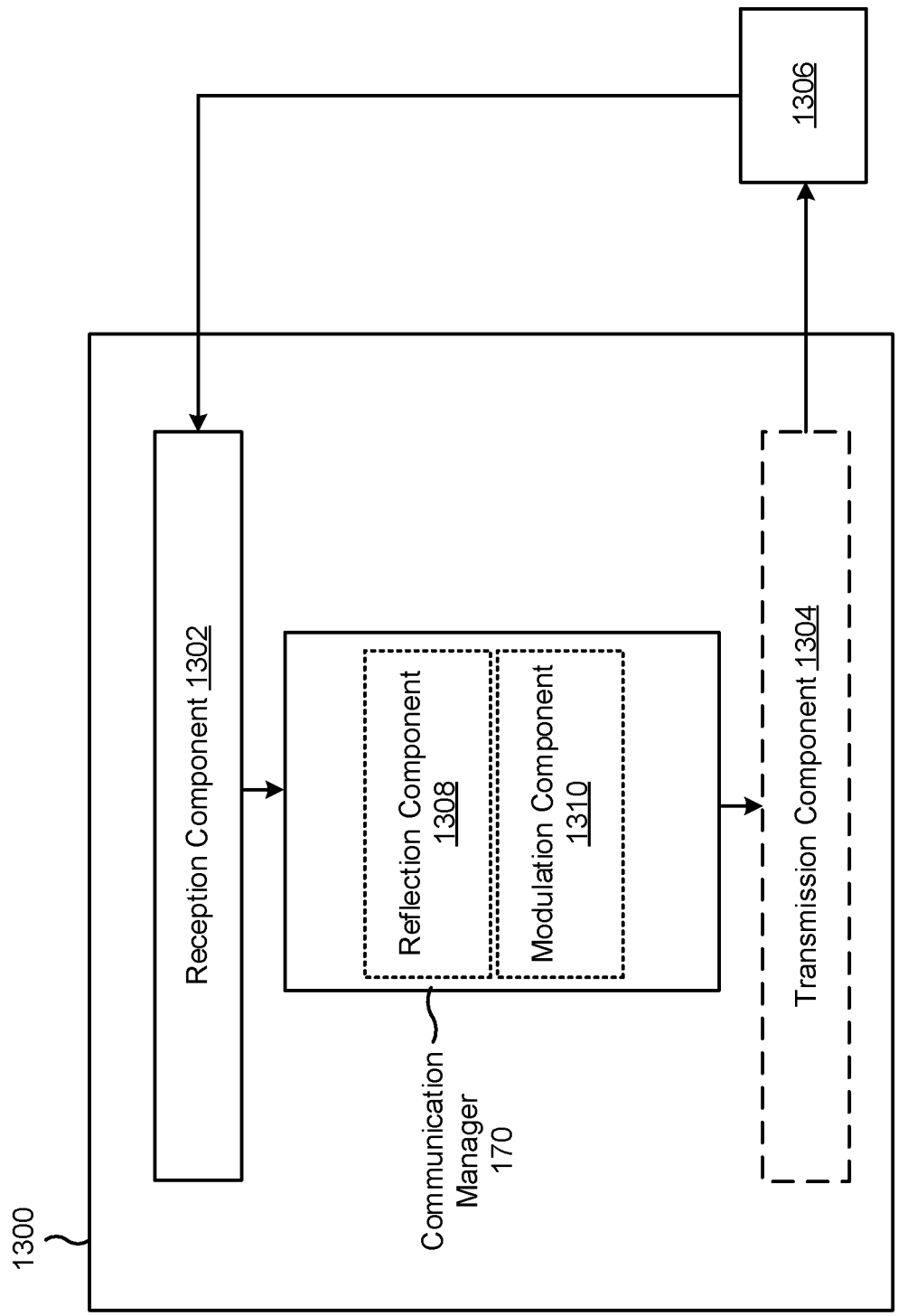

FIG. 13 is a diagram of an example apparatus 1300 for wireless communication. The apparatus 1300 may be an RIS, or an RIS may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 170. The communication manager 170 may include one or more of a reflection component 1308 and/or a modulation component 1310, among other examples.

In some aspects, the apparatus 1300 may be configured to perform one or more operations described herein in connection with FIGS. 5A, 5B, 6 and 7. Additionally, or alternatively, the apparatus 1300 may be configured to perform one or more processes described herein, such as process 1000 of FIG. 10, or a combination thereof. In some aspects, the apparatus 1300 and/or one or more components shown in FIG. 13 may include one or more components of the RIS described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the RIS described in connection with FIG. 2.

In some aspects, the reception component may include one or more reconfigurable elements that are configured to reflect and/or redirect signals.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the RIS described in connection with FIG. 2. In some aspects, the transmission component 1304 may be co-located with the reception component 1302 in a transceiver. In some aspects, the RIS may not include a transmission component 1204.

The reception component 1302 may receive, from a transmitter, an indication of a modulation signature associated with the RIS. The reception component 1302 may receive, from the transmitter, a signal. The reflection component 1308 may redirect the signal using the modulation signature, wherein the modulation signature identifies a link associated with the RIS and the transmitter.

The modulation component 1310 may modulate the signal in accordance with the modulation signature.

The reception component 1302 may receive, from the transmitter, a new signal. The reflection component 1308 may redirect the new signal using a modified modulation signature associated with the RIS, wherein the modified modulation signature is based at least in part on a communication parameter.

The reception component 1302 may receive, from the transmitter, a sensing signal that includes a set of symbols. The modulation component 1310 may modulate the set of symbols in phase using a sequence of orthogonal phase modulation across the set of symbols.

The reception component 1302 may receive, from the transmitter a set of repetitions of a sensing signal. The reflection component 1308 may redirect the set of repetitions, wherein each repetition of the set of repetitions uses a different beam direction of the RIS.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a receiver, comprising: receiving, from a transmitter, an indication of a modulation signature associated with a reconfigurable intelligent surface (RIS); and receiving a signal that uses the modulation signature, wherein the modulation signature identifies a link associated with the RIS and the transmitter.

Aspect 2: The method of Aspect 1, wherein the modulation signature is at least one of a phase modulation signature, a polarization modulation signature, or an amplitude modulation signature.

Aspect 3: The method of any of Aspects 1-2, wherein the signal is redirected by the RIS from the transmitter to the receiver, and wherein the modulation signature modulates the signal at each symbol of a set of symbols associated with the signal or at a subset of symbols of the set of symbols.

Aspect 4: The method of any of Aspects 1-3, wherein the modulation signature is a phase modulation signature or a polarization modulation signature, and wherein receiving the signal that uses the modulation signature comprises: detecting a modulation associated with the signal using a reference signal included in the signal, wherein the reference signal is included in a symbol of the signal associated with a modulation change of the signal, and wherein the reference signal is a phase tracking reference signal or a polarization detection reference signal.

Aspect 5: The method of Aspect 4, wherein the modulation signature is the polarization modulation signature and the reference signal is the polarization detection reference signal, and wherein the reference signal is associated with at least two ports.

Aspect 6: The method of any of Aspects 1-5, wherein the modulation signature is a phase modulation signature, and wherein the signal is modulated in phase in accordance with a pattern that identifies the RIS, wherein the pattern includes phase changes that are included in a set of phase changes.

Aspect 7: The method of any of Aspects 1-5, wherein the modulation signature is a polarization modulation signature, wherein the polarization modulation signature modifies a polarization state of the signal from a first polarization state of the signal as transmitted by the transmitter to a second polarization state of the signal as reflected by the RIS, and wherein the polarization state includes an angle of polarization or a polarization mode.

Aspect 8: The method of any of Aspects 1-3, wherein the modulation signature is an amplitude modulation signature, wherein the amplitude modulation signature attenuates the amplitude of the signal in accordance with a pattern that identifies the RIS.

Aspect 9: The method of Aspect 8, wherein the amplitude modulation signature attenuates the amplitude of the signal by puncturing the signal at one or more symbols or by modulating a spatial direction of the signal.

Aspect 10: The method of any of Aspects 1-9, wherein receiving the indication of the modulation signature associated with the RIS comprises: receiving the indication of the modulation signature associated with the RIS via at least one of a system information message, a radio resource control message, or a medium access control (MAC) control element (MAC-CE) message.

Aspect 11: The method of any of Aspects 1-10, wherein the modulation signature identifies the RIS and a beam state or beam direction associated with the RIS.

Aspect 12: The method of any of Aspects 1-11, further comprising: receiving a new signal using a modified modulation signature associated with the RIS, wherein the modified modulation signature is based at least in part on a communication parameter.

Aspect 13: The method of Aspect 12, wherein the communication parameter includes at least one of: a signal type of the new signal, a modulation and coding scheme, a time domain resource allocation, a frequency domain resource allocation, a Doppler spread, or a delay spread.

Aspect 14: The method of any of Aspects 12-13, further comprising: decoding the new signal by performing hypothesis testing of one or more candidate modulation signatures to identify the modified modulation signature.

Aspect 15: The method of any of Aspects 1-5 and 10-14, wherein the modulation signature is a phase modulation signature, and wherein a first set of symbols of the signal include a phase tracking reference signal or a demodulation reference signal and a second set of symbols of the signal do not include a reference signal, and wherein a phase modulation of a symbol included in the second set of symbols is interpolated or extrapolated from a phase of the signal in at least one symbol included in the first set of symbols.

Aspect 16: The method of any of Aspects 1-5 and 10-15, wherein the modulation signature is a phase modulation signature, wherein a first set of symbols of the signal include a phase tracking reference signal or a demodulation reference signal and a second set of symbols of the signal do not include a reference signal, and wherein receiving the signal using the modulation signature comprises: decoding the signal by identifying a first phase of the signal in at least one symbol of the first set of symbols using a phase tracking reference signal or a demodulation reference signal and by identifying a second phase of the signal in a symbol of the second set of symbols by interpolating or extrapolating the second phase from the first phase.

Aspect 17: The method of Aspect 16, wherein the at least one symbol of the first set of symbols include a first symbol and a second symbol, and wherein the symbol of the second set of symbols is adjacent to the first symbol and the second symbol, wherein the second phase is interpolated from a third phase of the first symbol and a fourth phase of the second symbol.

Aspect 18: The method of any of Aspects 16-17, wherein the at least one symbol of the first set of symbols includes a first symbol, and wherein the symbol of the second set of symbols is located prior to or after the first symbol in a time domain, and wherein the second phase is extrapolated from a third phase of the first symbol.

Aspect 19: The method of any of Aspects 16-18, wherein symbols included in the second set of symbols are modulated in phase based at least in part on the link associated with the RIS and the transmitter being a dominant link, wherein the link associated with the RIS and the transmitter being the dominant link is based at least in part on a power ratio of the signal satisfying a threshold.

Aspect 20: The method of Aspect 19, further comprising: receiving a sensing signal that includes a set of symbols, wherein the set of symbols modulated in phase by the RIS using a sequence of orthogonal phase modulation across the set of symbols; and demodulating the sensing signal to identify the power ratio of the signal.

Aspect 21: The method of Aspect 19, further comprising: receiving a set of repetitions of a sensing signal, wherein each repetition of the set of repetitions uses a different beam direction of the RIS; measuring a reference signal received power (RSRP) of the set of repetitions; and transmitting, to the transmitter, an indication of the RSRP of the set of repetitions, wherein the power ratio is based at least in part on the RSRP of the set of repetitions.

Aspect 22: The method of any of Aspects 16-21, wherein the second phase of the signal in the symbol of the second set of symbols is identified using a scheme, the method further comprising: transmitting, to the transmitter, an indication of the scheme used by the receiver via at least one of an uplink control information message, a sidelink control information message, a physical sidelink feedback channel message, a medium access control (MAC) control element (MAC-CE) message, or a user equipment assistance information message.

Aspect 23: The method of any of Aspects 16-21, wherein the second phase of the signal in the symbol of the second set of symbols is identified using a scheme, the method further comprising: receiving, from the transmitter, an indication of the scheme to be used by the receiver via at least one of a radio resource control message, a system information message, a downlink control information message, a sidelink control information message, a physical sidelink feedback channel message, or a medium access control (MAC) control element (MAC-CE) message.

Aspect 24: A method of wireless communication performed by a transmitter, comprising: transmitting, to a receiver, an indication of a modulation signature associated with a reconfigurable intelligent surface (RIS); and transmitting a signal that is reflected by the RIS to the receiver, wherein the RIS redirects the signal using the modulation signature, and wherein the modulation signature identifies a link associated with the RIS and the transmitter.

Aspect 25: The method of Aspect 24, wherein the modulation signature is at least one of a phase modulation signature, a polarization modulation signature, or an amplitude modulation signature.

Aspect 26: The method of any of Aspects 24-25, wherein the signal is redirected by the RIS from the transmitter to the receiver, and wherein the modulation signature modulates the signal at each symbol of a set of symbols associated with the signal or at a subset of symbols of the set of symbols.

Aspect 27: The method of any of Aspects 24-26, wherein the modulation signature is a phase modulation signature or a polarization modulation signature, and wherein transmitting the signal that uses the modulation signature comprises: transmitting the signal including a reference signal, wherein the reference signal is included in a symbol of the signal associated with a modulation change of the signal, and wherein the reference signal is a phase tracking reference signal or a polarization detection reference signal.

Aspect 28: The method of Aspect 27, wherein the modulation signature is the polarization modulation signature and the reference signal is the polarization detection reference signal, and wherein the reference signal is associated with at least two ports.

Aspect 29: The method of any of Aspects 24-28, wherein the modulation signature is a polarization modulation signature, wherein the polarization modulation signature modifies a polarization state of the signal from a first polarization state of the signal as transmitted by the transmitter to a second polarization state of the signal as reflected by the RIS, and wherein the polarization state includes an angle of polarization or a polarization mode.

Aspect 30: The method of any of Aspects 24-26, wherein the modulation signature is an amplitude modulation signature, wherein the amplitude modulation signature attenuates the amplitude of the signal in accordance with a pattern that identifies the RIS.

Aspect 31: The method of Aspect 30, wherein the amplitude modulation signature attenuates the amplitude of the signal by puncturing the signal at one or more symbols or by modulating a spatial direction of the signal.

Aspect 32: The method of any of Aspects 24-31, wherein transmitting the indication of the modulation signature associated with the RIS comprises: transmitting the indication of the modulation signature associated with the RIS via at least one of a system information message, a radio resource control message, or a medium access control (MAC) control element (MAC-CE) message.

Aspect 33: The method of any of Aspects 24-32, wherein the modulation signature identifies the RIS and a beam state or beam direction associated with the RIS.

Aspect 34: The method of any of Aspects 24-33, further comprising: transmitting a new signal, wherein the new signal is redirected by the RIS using a modified modulation signature associated with the RIS, wherein the modified modulation signature is based at least in part on a communication parameter.

Aspect 35: The method of Aspect 34, wherein the communication parameter includes at least one of: a signal type of the new signal, a modulation and coding scheme, a time domain resource allocation, a frequency domain resource allocation, a Doppler spread, or a delay spread.

Aspect 36: The method of any of Aspects 24-28 and 32-35, wherein the modulation signature is a phase modulation signature, and wherein a first set of symbols of the signal include a phase tracking reference signal or a demodulation reference signal and a second set of symbols of the signal do not include a reference signal, and wherein a phase modulation of a symbol included in the second set of symbols is interpolated or extrapolated from a phase of the signal in at least one symbol included in the first set of symbols.

Aspect 37: The method of Aspect 36, wherein symbols included in the second set of symbols are modulated in phase based at least in part on the link associated with the RIS and the transmitter being a dominant link, wherein the link associated with the RIS and the transmitter being the dominant link is based at least in part on a power ratio of the signal satisfying a threshold.

Aspect 38: The method of Aspect 37, further comprising: transmitting a sensing signal that includes a set of symbols, wherein the set of symbols modulated in phase by the RIS using a sequence of orthogonal phase modulation across the set of symbols, wherein the power ratio is based at least in part on a demodulation of the signal.

Aspect 39: The method of any of Aspects 37-38, further comprising: transmitting a set of repetitions of a sensing signal, wherein each repetition of the set of repetitions is redirected by the RIS using a different beam direction of the RIS; and receiving, from the receiver, an indication of a reference signal received power (RSRP) of the set of repetitions, wherein the power ratio is based at least in part on the RSRP of the set of repetitions.

Aspect 40: The method of any of Aspects 36-39, wherein the phase modulating of the signal in the symbol of the second set of symbols is identified using a scheme, the method further comprising: receiving, from the receiver, an indication of the scheme used by the receiver via at least one of an uplink control information message, a sidelink control information message, a physical sidelink feedback channel message, a medium access control (MAC) control element (MAC-CE) message, or a user equipment assistance information message.

Aspect 41: The method of any of Aspects 36-39, wherein the phase modulation of the signal in the symbol of the second set of symbols is identified using a scheme, the method further comprising: transmitting, from the receiver, an indication of the scheme to be used by the receiver via at least one of a radio resource control message, a system information message, a downlink control information message, a sidelink control information message, a physical sidelink feedback channel message, or a medium access control (MAC) control element (MAC-CE) message.

Aspect 42: A method of wireless communication performed by a reconfigurable intelligent surface (RIS), comprising: receiving, from a transmitter, an indication of a modulation signature associated with the RIS; receiving, from the transmitter, a signal; and redirecting the signal using the modulation signature, wherein the modulation signature identifies a link associated with the RIS and the transmitter.

Aspect 43: The method of Aspect 42, wherein the modulation signature is at least one of a phase modulation signature, a polarization modulation signature, or an amplitude modulation signature.

Aspect 44: The method of any of Aspects 42-43, wherein the modulation signature modulates the signal at each symbol of a set of symbols associated with the signal or at a subset of symbols of the set of symbols.

Aspect 45: The method of any of Aspects 42-44, wherein the modulation signature is a phase modulation signature or a polarization modulation signature, and wherein redirecting the signal comprises: modulating the signal in symbols that include a reference signal, wherein the reference signal is a phase tracking reference signal or a polarization detection reference signal.

Aspect 46: The method of any of Aspects 42-45, wherein the modulation signature is a polarization modulation signature, wherein the redirecting the signal comprises: modulating a polarization state of the signal from a first polarization state of the signal as transmitted by the transmitter to a second polarization state of the signal, wherein the polarization state includes an angle of polarization or a polarization mode.

Aspect 47: The method of any of Aspects 42-43, wherein the modulation signature is an amplitude modulation signature, wherein the redirecting the signal comprises: modulating the amplitude of the signal by attenuating the amplitude of the signal in accordance with a pattern that identifies the RIS.

Aspect 48: The method of Aspect 47, wherein modulating the amplitude of the signal comprises: puncturing the signal at one or more symbols of the signal; or modulating a spatial direction of the signal.

Aspect 49: The method of any of Aspects 42-48, wherein receiving the indication of the modulation signature associated with the RIS comprises: receiving the indication of the modulation signature associated with the RIS via at least one of a system information message, a radio resource control message, or a medium access control (MAC) control element (MAC-CE) message.

Aspect 50: The method of any of Aspects 42-49, wherein the modulation signature identifies the RIS and a beam state or beam direction associated with the RIS.

Aspect 51: The method of any of Aspects 42-50, further comprising: receiving, from the transmitter, a new signal; and redirecting the new signal using a modified modulation signature associated with the RIS, wherein the modified modulation signature is based at least in part on a communication parameter.

Aspect 52: The method of Aspect 51, wherein the communication parameter includes at least one of: a signal type of the new signal, a modulation and coding scheme, a time domain resource allocation, a frequency domain resource allocation, a Doppler spread, or a delay spread.

Aspect 53: The method of any of Aspects 42-46 and 49-52, wherein the modulation signature is a phase modulation signature, and wherein a first set of symbols of the signal include a phase tracking reference signal or a demodulation reference signal and a second set of symbols of the signal do not include a reference signal, and wherein a phase modulation of a symbol included in the second set of symbols is interpolated or extrapolated from a phase of the signal in at least one symbol included in the first set of symbols.

Aspect 54: The method of any of Aspects 42-46 and 49-53, wherein the modulation signature is a phase modulation signature, wherein a first set of symbols of the signal include a phase tracking reference signal or a demodulation reference signal and a second set of symbols of the signal do not include a reference signal, and wherein redirecting the signal comprises: modulating the signal by a first phase change in at least one symbol of the first set of symbols; and modulating the signal by a second phase change in a symbol of the second set of symbols by interpolating or extrapolating the second phase change from the first phase change.

Aspect 55: The method of Aspect 54, wherein the at least one symbol of the first set of symbols include a first symbol and a second symbol, and wherein the symbol of the second set of symbols is adjacent to the first symbol and the second symbol, wherein the second phase change is interpolated from a third phase change of the first symbol and a fourth phase change of the second symbol.

Aspect 56: The method of any of Aspects 54-55, wherein the at least one symbol of the first set of symbols includes a first symbol, and wherein the symbol of the second set of symbols is located prior to or after the first symbol in a time domain, and wherein the second phase change is extrapolated from a third phase change of the first symbol.

Aspect 57: The method of any of Aspects 54-56, wherein symbols included in the second set of symbols are modulated in phase based at least in part on the link associated with the RIS and the transmitter being a dominant link, wherein the link associated with the RIS and the transmitter being the dominant link is based at least in part on a power ratio of the signal satisfying a threshold.

Aspect 58: The method of Aspect 57, further comprising: receiving, from the transmitter, a sensing signal that includes a set of symbols; and modulating the set of symbols in phase using a sequence of orthogonal phase modulation across the set of symbols.

Aspect 59: The method of any of Aspects 57-58, further comprising: receiving, from the transmitter a set of repetitions of a sensing signal; and redirecting the set of repetitions, wherein each repetition of the set of repetitions uses a different beam direction of the RIS.

Aspect 60: The method of any of Aspects 54-59, wherein the second phase change of the signal in the symbol of the second set of symbols is identified using a scheme, the method further comprising: receiving, from the receiver, an indication of the scheme used by the receiver via at least one of an uplink control information message, a sidelink control information message, a physical sidelink feedback channel message, a medium access control (MAC) control element (MAC-CE) message, or a user equipment assistance information message.

Aspect 61: The method of any of Aspects 54-59, wherein the second phase change of the signal in the symbol of the second set of symbols is identified using a scheme, the method further comprising: receiving, from the transmitter, an indication of the scheme to be used by the receiver via at least one of a radio resource control message, a system information message, a downlink control information message, a sidelink control information message, a physical sidelink feedback channel message, or a medium access control (MAC) control element (MAC-CE) message.

Aspect 62: An apparatus for wireless communication at a device, comprising a processor; memory coupled with the processor; and instructions stored in the memory and executable by the processor to cause the apparatus to perform the method of one or more of Aspects 1-23.

Aspect 63: A device for wireless communication, comprising a memory and one or more processors coupled to the memory, the one or more processors configured to perform the method of one or more of Aspects 1-23.

Aspect 64: An apparatus for wireless communication, comprising at least one means for performing the method of one or more of Aspects 1-23.

Aspect 65: A non-transitory computer-readable medium storing code for wireless communication, the code comprising instructions executable by a processor to perform the method of one or more of Aspects 1-23.

Aspect 66: A non-transitory computer-readable medium storing a set of instructions for wireless communication, the set of instructions comprising one or more instructions that, when executed by one or more processors of a device, cause the device to perform the method of one or more of Aspects 1-23.

Aspect 67: An apparatus for wireless communication at a device, comprising a processor; memory coupled with the processor; and instructions stored in the memory and executable by the processor to cause the apparatus to perform the method of one or more of Aspects 24-41.

Aspect 68: A device for wireless communication, comprising a memory and one or more processors coupled to the memory, the one or more processors configured to perform the method of one or more of Aspects 24-41.

Aspect 69: An apparatus for wireless communication, comprising at least one means for performing the method of one or more of Aspects 24-41.

Aspect 70: A non-transitory computer-readable medium storing code for wireless communication, the code comprising instructions executable by a processor to perform the method of one or more of Aspects 24-41.

Aspect 71: A non-transitory computer-readable medium storing a set of instructions for wireless communication, the set of instructions comprising one or more instructions that, when executed by one or more processors of a device, cause the device to perform the method of one or more of Aspects 24-41.

Aspect 72: An apparatus for wireless communication at a device, comprising a processor; memory coupled with the processor; and instructions stored in the memory and executable by the processor to cause the apparatus to perform the method of one or more of Aspects 42-61.

Aspect 73: A device for wireless communication, comprising a memory and one or more processors coupled to the memory, the one or more processors configured to perform the method of one or more of Aspects 42-61.

Aspect 74: An apparatus for wireless communication, comprising at least one means for performing the method of one or more of Aspects 42-61.

Aspect 75: A non-transitory computer-readable medium storing code for wireless communication, the code comprising instructions executable by a processor to perform the method of one or more of Aspects 42-61.

Aspect 76: A non-transitory computer-readable medium storing a set of instructions for wireless communication, the set of instructions comprising one or more instructions that, when executed by one or more processors of a device, cause the device to perform the method of one or more of Aspects 42-61.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A receiver for wireless communication, comprising:
a memory; and
one or more processors, coupled to the memory, configured to:
receive, from a transmitter, an indication of a modulation signature associated with a reconfigurable intelligent surface (RIS); and
receive a signal that uses the modulation signature, wherein the modulation signature identifies a link associated with the RIS and the transmitter.

2. The receiver of claim 1, wherein the modulation signature is at least one of a phase modulation signature, a polarization modulation signature, or an amplitude modulation signature.

3. The receiver of claim 1, wherein the signal is redirected by the RIS from the transmitter to the receiver, and wherein the modulation signature modulates the signal at each symbol of a set of symbols associated with the signal or at a subset of symbols of the set of symbols.

4. The receiver of claim 1, wherein the modulation signature is a phase modulation signature or a polarization modulation signature, and wherein the one or more processors, to receive the signal that uses the modulation signature, are configured to:
detect a modulation associated with the signal using a reference signal included in the signal, wherein the reference signal is included in a symbol of the signal associated with a modulation change of the signal, wherein the reference signal is a phase tracking reference signal when the modulation signature is the phase modulation signature, and wherein the reference signal is a polarization detection reference signal when the modulation signature is the polarization modulation signature.

5. The receiver of claim 1, wherein the modulation signature is a phase modulation signature, and wherein the signal is modulated in phase in accordance with a pattern that identifies the RIS, wherein the pattern includes phase changes that are included in a set of phase changes.

6. The receiver of claim 1, wherein the modulation signature is a polarization modulation signature, wherein the polarization modulation signature modifies a polarization state of the signal from a first polarization state of the signal as transmitted by the transmitter to a second polarization state of the signal as reflected by the RIS, and wherein the polarization state includes an angle of polarization or a polarization mode.

7. The receiver of claim 1, wherein the modulation signature is an amplitude modulation signature, wherein the amplitude modulation signature attenuates an amplitude of the signal in accordance with a pattern that identifies the RIS.

8. The receiver of claim 1, wherein the modulation signature identifies the RIS and a beam state or beam direction associated with the RIS.

9. The receiver of claim 1, wherein the one or more processors are further configured to:
receive a new signal using a modified modulation signature associated with the RIS, wherein the modified modulation signature is based at least in part on a communication parameter.

10. The receiver of claim 1, wherein the modulation signature is a phase modulation signature, and wherein a first set of symbols of the signal include a phase tracking reference signal or a demodulation reference signal and a second set of symbols of the signal do not include a reference signal, and wherein a phase modulation of a symbol included in the second set of symbols is interpolated or extrapolated from a phase of the signal in at least one symbol included in the first set of symbols.

11. The receiver of claim 1, wherein the modulation signature is a phase modulation signature, wherein a first set of symbols of the signal include a phase tracking reference signal or a demodulation reference signal and a second set of symbols of the signal do not include a reference signal, and wherein the one or more processors, to receive the signal using the modulation signature, are configured to:
decode the signal by identifying a first phase of the signal in at least one symbol of the first set of symbols using the phase tracking reference signal or the demodulation reference signal and by identifying a second phase of the signal in a symbol of the second set of symbols by interpolating or extrapolating the second phase from the first phase.

12. The receiver of claim 11, wherein symbols included in the second set of symbols are modulated in phase based at least in part on the link associated with the RIS and the transmitter being a dominant link, wherein the link associated with the RIS and the transmitter being the dominant link is based at least in part on a power ratio of the signal satisfying a threshold.

13. A transmitter for wireless communication, comprising:
a memory; and
one or more processors, coupled to the memory, configured to:
transmit, to a receiver, an indication of a modulation signature associated with a reconfigurable intelligent surface (RIS); and
transmit a signal that is reflected by the RIS to the receiver, wherein the RIS redirects the signal using the modulation signature, and wherein the modulation signature identifies a link associated with the RIS and the transmitter.

14. The transmitter of claim 13, wherein the modulation signature is at least one of a phase modulation signature, a polarization modulation signature, or an amplitude modulation signature.

15. The transmitter of claim 13, wherein the modulation signature is a phase modulation signature or a polarization modulation signature, and wherein the one or more processors, to transmit the signal that uses the modulation signature, are configured to:
transmit the signal including a reference signal, wherein the reference signal is included in a symbol of the signal associated with a modulation change of the signal, and wherein the reference signal is a phase tracking reference signal or a polarization detection reference signal.

16. A method of wireless communication performed by a receiver, comprising:
receiving, from a transmitter, an indication of a modulation signature associated with a reconfigurable intelligent surface (RIS); and
receiving a signal that uses the modulation signature, wherein the modulation signature identifies a link associated with the RIS and the transmitter.

17. The method of claim 16, wherein the modulation signature is at least one of a phase modulation signature, a polarization modulation signature, or an amplitude modulation signature.

18. The method of claim 16, wherein the signal is redirected by the RIS from the transmitter to the receiver, and wherein the modulation signature modulates the signal at each symbol of a set of symbols associated with the signal or at a subset of symbols of the set of symbols.

19. The method of claim 16, wherein the modulation signature is a phase modulation signature or a polarization modulation signature, and wherein receiving the signal that uses the modulation signature comprises:
detecting a modulation associated with the signal using a reference signal included in the signal, wherein the reference signal is included in a symbol of the signal associated with a modulation change of the signal, wherein the reference signal is a phase tracking reference signal when the modulation signature is the phase modulation signature, and wherein the reference signal is a polarization detection reference signal when the modulation signature is the polarization modulation signature.

20. The method of claim 16, wherein the modulation signature is a phase modulation signature, and wherein the signal is modulated in phase in accordance with a pattern that identifies the RIS, wherein the pattern includes phase changes that are included in a set of phase changes.

21. The method of claim 16, wherein the modulation signature is a polarization modulation signature, wherein the polarization modulation signature modifies a polarization state of the signal from a first polarization state of the signal as transmitted by the transmitter to a second polarization state of the signal as reflected by the RIS, and wherein the polarization state includes an angle of polarization or a polarization mode.

22. The method of claim 16, wherein the modulation signature is an amplitude modulation signature, wherein the amplitude modulation signature attenuates an amplitude of the signal in accordance with a pattern that identifies the RIS.

23. The method of claim 16, wherein the modulation signature identifies the RIS and a beam state or beam direction associated with the RIS.

24. The method of claim 16, further comprising:
receiving a new signal using a modified modulation signature associated with the RIS, wherein the modified modulation signature is based at least in part on a communication parameter.

25. The method of claim 16, wherein the modulation signature is a phase modulation signature, and wherein a first set of symbols of the signal include a phase tracking reference signal or a demodulation reference signal and a second set of symbols of the signal do not include a reference signal, and wherein a phase modulation of a symbol included in the second set of symbols is interpolated or extrapolated from a phase of the signal in at least one symbol included in the first set of symbols.

26. The method of claim 16, wherein the modulation signature is a phase modulation signature, wherein a first set of symbols of the signal include a phase tracking reference signal or a demodulation reference signal and a second set of symbols of the signal do not include a reference signal, and wherein receiving the signal using the modulation signature comprises:
decoding the signal by identifying a first phase of the signal in at least one symbol of the first set of symbols using the phase tracking reference signal or the demodulation reference signal and by identifying a second phase of the signal in a symbol of the second set of symbols by interpolating or extrapolating the second phase from the first phase.

27. The method of claim 26, wherein symbols included in the second set of symbols are modulated in phase based at least in part on the link associated with the RIS and the transmitter being a dominant link, wherein the link associated with the RIS and the transmitter being the dominant link is based at least in part on a power ratio of the signal satisfying a threshold.

28. A method of wireless communication performed by a transmitter, comprising:
transmitting, to a receiver, an indication of a modulation signature associated with a reconfigurable intelligent surface (RIS); and
transmitting a signal that is reflected by the RIS to the receiver, wherein the RIS redirects the signal using the modulation signature, and wherein the modulation signature identifies a link associated with the RIS and the transmitter.

29. The method of claim 28, wherein the modulation signature is at least one of a phase modulation signature, a polarization modulation signature, or an amplitude modulation signature.

30. The method of claim 28, wherein the modulation signature is a phase modulation signature or a polarization modulation signature, and wherein transmitting the signal that uses the modulation signature comprises:
transmitting the signal including a reference signal, wherein the reference signal is included in a symbol of the signal associated with a modulation change of the signal, wherein the reference signal is a phase tracking reference signal when the modulation signature is the phase modulation signature, and wherein the reference signal is a polarization detection reference signal when the modulation signature is the polarization modulation signature.

* * * * *